US010757766B2

United States Patent
Rollet et al.

(10) Patent No.: US 10,757,766 B2
(45) Date of Patent: Aug. 25, 2020

(54) RF OVEN CONTROL AND INTERFACE

(71) Applicant: ILLINOIS TOOL WORKS, INC., Glenview, IL (US)

(72) Inventors: Christine Rollet, Evanston, IL (US); Sheena Madden, Chicago, IL (US); Andrea Baccara, Chicago, IL (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 339 days.

(21) Appl. No.: 15/812,077

(22) Filed: Nov. 14, 2017

(65) Prior Publication Data

US 2018/0152998 A1  May 31, 2018

Related U.S. Application Data

(60) Provisional application No. 62/428,014, filed on Nov. 30, 2016.

(51) Int. Cl.
 *H05B 6/64* (2006.01)
 *G06F 3/0481* (2013.01)
 (Continued)

(52) U.S. Cl.
 CPC ........... *H05B 6/6473* (2013.01); *F24C 7/086* (2013.01); *F24C 15/322* (2013.01);
 (Continued)

(58) Field of Classification Search
 CPC .... H05B 6/6473; H05B 6/647; H05B 6/6435; H05B 6/6438; F24C 7/086; F24C 15/322; G06F 3/0481
 (Continued)

(56) References Cited

U.S. PATENT DOCUMENTS

2006/0102624 A1  5/2006  Ryu et al.
2007/0000911 A1  1/2007  Lubrina
(Continued)

FOREIGN PATENT DOCUMENTS

| DE | 102005042223 A1 | 9/2006 |
| DE | 202014101897 U1 | 3/2015 |
| EP | 2574849 A2 | 4/2013 |

OTHER PUBLICATIONS

International Search Report and Written Opinion of PCT/US2017/062919 dated Mar. 12, 2018, all enclosed pages cited.

*Primary Examiner* — Huyen D Le
(74) *Attorney, Agent, or Firm* — Burr & Forman, LLP

(57) ABSTRACT

An oven may include a cooking chamber configured to receive a food product, a convective heating system configured to provide heated air into the cooking chamber, a radio frequency (RF) heating system configured to provide RF energy into the cooking chamber using solid state electronic components, and control electronics configured to control the convective heating system and the RF heating system. The control electronics may further control a user interface configured to define one or more control consoles. At least one of the control consoles may enable a user to select a cooking program. The user interface may further provide a single indicator showing a graphical representation of current progress relative to a representation of a full commitment of time to complete the selected cooking program. The single indicator may further provide a selectable operator that is operable to control progress toward completing the selected cooking program.

20 Claims, 21 Drawing Sheets

(51) Int. Cl.
 *F24C 7/08* (2006.01)
 *F24C 15/32* (2006.01)

(52) U.S. Cl.
 CPC ......... *G06F 3/0481* (2013.01); *H05B 6/6435* (2013.01); *H05B 6/6438* (2013.01)

(58) Field of Classification Search
 USPC ....................................................... 219/681
 See application file for complete search history.

(56) References Cited

U.S. PATENT DOCUMENTS

| | | | |
|---|---|---|---|
| 2011/0087987 A1 | 4/2011 | Brown | |
| 2013/0092145 A1* | 4/2013 | Murphy | F24C 7/085 126/21 R |
| 2013/0092680 A1 | 4/2013 | Cartwright et al. | |
| 2013/0092682 A1* | 4/2013 | Mills | H05B 1/0263 219/702 |
| 2015/0282257 A1* | 10/2015 | Hoare | H05B 6/6411 219/719 |
| 2017/0242573 A1* | 8/2017 | Goss | G06F 3/0362 |
| 2018/0160487 A1* | 6/2018 | Reed | H05B 6/6438 |
| 2018/0188947 A1* | 7/2018 | Bruin-Slot | G06F 3/04886 |

* cited by examiner

RF OVEN CONTROL AND INTERFACE

CROSS REFERENCE TO RELATED APPLICATIONS

This application claims priority to U.S. application No. 62/428,014 filed Nov. 30, 2016, the entire contents of which are hereby incorporated by reference in its entirety.

TECHNICAL FIELD

Example embodiments generally relate to ovens and, more particularly, relate to an oven that is enabled to cook food with the application of airflow and radio frequency (RF) energy within an oven cavity.

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality.

In some cases, microwave cooking may be faster than convection or other types of cooking. Thus, microwave cooking may be employed to speed up the cooking process. However, a microwave typically cannot be used to cook some foods and also cannot brown foods. Given that browning may add certain desirable characteristics in relation to taste and appearance, it may be necessary to employ another cooking method in addition to microwave cooking in order to achieve browning. In some cases, the application of heat for purposes of browning may involve the use of heated airflow provided within the oven cavity to deliver heat to a surface of the food product.

However, even by employing a combination of microwave and airflow, the limitations of conventional microwave cooking relative to penetration of the food product may still render the combination less than ideal. Moreover, a typical microwave is somewhat indiscriminate or uncontrollable in the way it applies energy to the food product. Thus, it may be desirable to provide further improvements to the ability of an operator to achieve a superior cooking result. Providing an oven with improved capabilities relative to cooking food with a combination of controllable RF energy and convection energy may also enable unique opportunities for control of and interface with the oven.

BRIEF SUMMARY OF SOME EXAMPLES

Some example embodiments may therefore provide improved mechanisms for control and interface with an oven that employs RF energy application along with the provision of heated airflow to at least partially cook (using either or both of the RF energy and the heated airflow) food disposed in an oven cavity. The oven may be configured to enable not only unique mechanisms for providing an improved cooking result, but the user experience may also be enhanced by a more intuitive and informative user interface.

In an example embodiment, an oven is provided. The oven may include a cooking chamber configured to receive a food product, a convective heating system configured to provide heated air into the cooking chamber, a radio frequency (RF) heating system configured to provide RF energy into the cooking chamber using solid state electronic components, and control electronics configured to control the convective heating system and the RF heating system. The control electronics may further control a user interface configured to define one or more control consoles. At least one of the control consoles may enable a user to select a cooking program. The user interface may further provide a single indicator showing a graphical representation of current progress relative to a representation of a full commitment of time to complete the selected cooking program. The single indicator may further provide a selectable operator that is operable to control progress toward completing the selected cooking program.

In an example embodiment, control electronics may be provided. The control electronics may include a user interface. The control electronics may be configured to control an RF heating system configured to provide RF energy into a cooking chamber of an oven using solid state electronic components. The control electronics may be configured to define one or more control consoles. At least one of the control consoles enables a user to select a cooking program for execution to cooking a food product in the cooking chamber via the RF heating system. The user interface may provide a single indicator showing a graphical representation of current progress relative to a representation of a full commitment of time to complete the selected cooking program. The single indicator further provides a selectable operator that is operable to control progress toward completing the selected cooking program.

Some example embodiments may improve the cooking performance and/or improve the operator experience when cooking with an oven employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
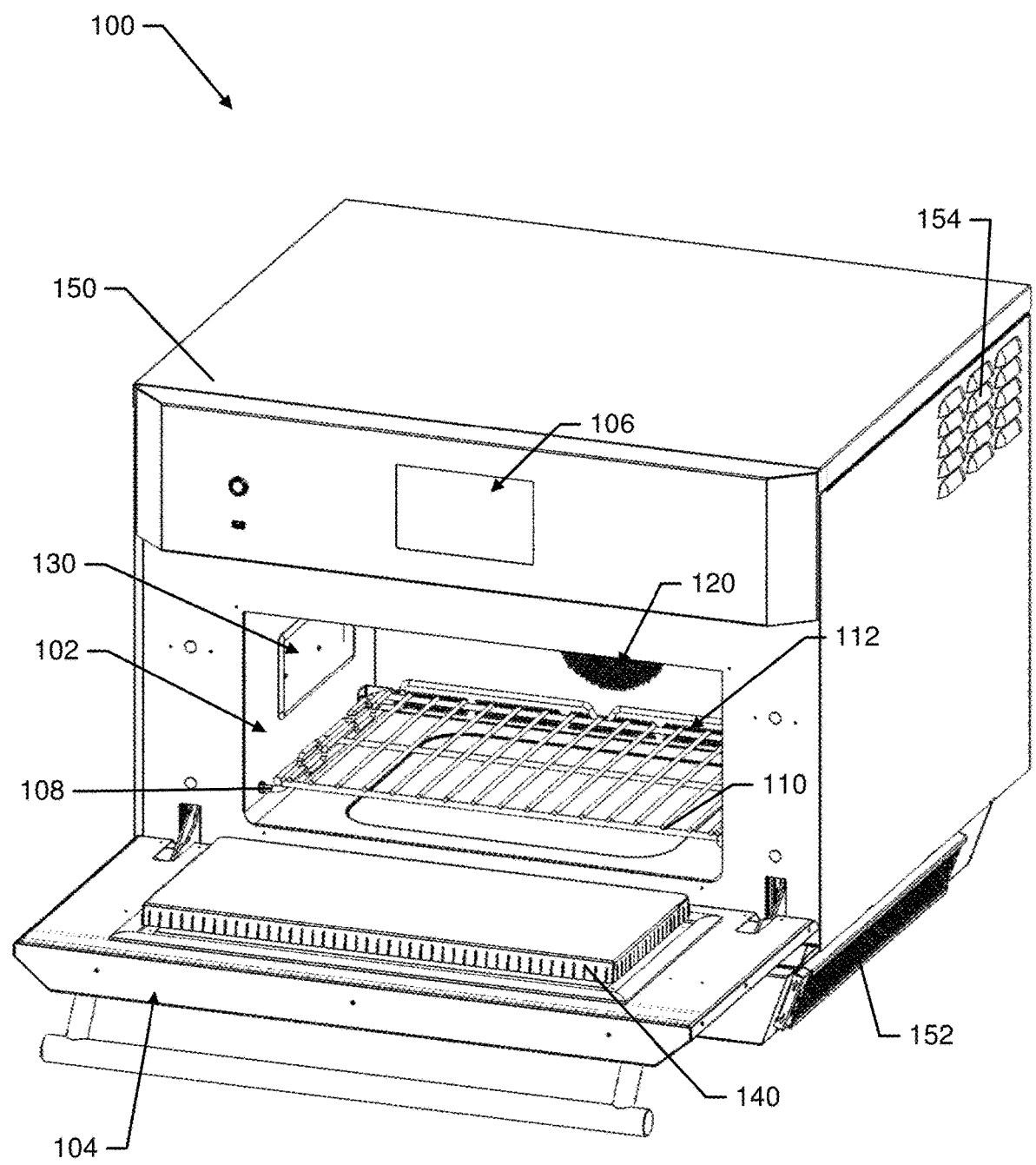
FIG. 1 illustrates a perspective view of an oven capable of employing at least two energy sources according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Furthermore, as used herein the term "browning" should be understood to refer to the Maillard reaction or other desirable food coloration reactions whereby the food product is turned brown via enzymatic or non-enzymatic processes.

Some example embodiments may improve the cooking performance of an oven and/or may improve the operator experience of individuals employing an example embodiment. In this regard, the oven may cook, at least in part, using solid state components for control of the application of RF energy. Various unique options for both control of the RF energy application, and for interaction with the oven generally may then be provided.

FIG. 1 illustrates a perspective view of an oven 100 according to an example embodiment. As shown in FIG. 1, the oven 100 may include a cooking chamber 102 into which a food product may be placed for the application of heat by any of at least two energy sources that may be employed by the oven 100. The cooking chamber 102 may include a door 104 and an interface panel 106, which may sit proximate to the door 104 when the door 104 is closed. In this regard, for example, the interface panel 106 may be located substantially above the door 104 (as shown in FIG. 1) or alongside the door 104 in alternative embodiments. In an example embodiment, the interface panel 106 may include a touch screen display capable of providing visual indications to an operator and further capable of receiving touch inputs from the operator. The interface panel 106 may be the mechanism by which instructions are provided to the operator, and the mechanism by which feedback is provided to the operator regarding cooking process status, options and/or the like.

In some embodiments, the oven 100 may include multiple racks or may include rack (or pan) supports 108 or guide slots in order to facilitate the insertion of one or more racks 110 or pans holding food product that is to be cooked. In an example embodiment, air delivery orifices 112 may be positioned proximate to the rack supports 108 (e.g., just below a level of the rack supports in one embodiment) to enable heated air to be forced into the cooking chamber 102 via a heated-air circulation fan (not shown in FIG. 1). The heated-air circulation fan may draw air in from the cooking chamber 102 via a chamber outlet port 120 disposed at a rear wall (i.e., a wall opposite the door 104) of the cooking chamber 102. Air may be circulated from the chamber outlet port 120 back into the cooking chamber 102 via the air delivery orifices 112. After removal from the cooking chamber 102 via the chamber outlet port 120, air may be cleaned, heated, and pushed through the system by other components prior to return of the clean, hot and speed controlled air back into the cooking chamber 102. This air circulation system, which includes the chamber outlet port 120, the air delivery orifices 112, the heated-air circulation fan, cleaning components, and all ducting therebetween, may form a first air circulation system within the oven 100.

Food product placed on a pan or one of the racks 110 (or simply on a base of the cooking chamber 102 in embodiments where racks 110 are not employed) may be heated at least partially using radio frequency (RF) energy. Meanwhile, the airflow that may be provided may be heated to enable further heating or even browning to be accomplished. Of note, a metallic pan may be placed on one of the rack supports 108 or racks 110 of some example embodiments. However, the oven 100 may be configured to employ frequencies and/or mitigation strategies for detecting and/or preventing any arcing that might otherwise be generated by using RF energy with metallic components.

In an example embodiment, the RF energy may be delivered to the cooking chamber 102 via an antenna assembly 130 disposed proximate to the cooking chamber 102. In some embodiments, multiple components may be provided in the antenna assembly 130, and the components may be placed on opposing sides of the cooking chamber 102. The antenna assembly 130 may include one or more instances of a power amplifier, a launcher, waveguide and/or the like that are configured to couple RF energy into the cooking chamber 102.

The cooking chamber 102 may be configured to provide RF shielding on five sides thereof (e.g., the top, bottom, back, and right and left sides), but the door 104 may include a choke 140 to provide RF shielding for the front side. The choke 140 may therefore be configured to fit closely with the opening defined at the front side of the cooking chamber 102 to prevent leakage of RF energy out of the cooking chamber 102 when the door 104 is shut and RF energy is being applied into the cooking chamber 102 via the antenna assembly 130.

The antenna assembly 130 may be configured to generate controllable RF emissions into the cooking chamber 102 using solid state components. Thus, the oven 100 may not employ any magnetrons, but instead use only solid state components for the generation and control of the RF energy applied into the cooking chamber 102. The use of solid state components may provide distinct advantages in terms of allowing the characteristics (e.g., power/energy level, phase and frequency) of the RF energy to be controlled to a greater degree than is possible using magnetrons. However, since relatively high powers are necessary to cook food, the solid state components themselves will also generate relatively high amounts of heat, which must be removed efficiently in order to keep the solid state components cool and avoid damage thereto. To cool the solid state components, the oven 100 may include a second air circulation system.

The second air circulation system may operate within an oven body 150 of the oven 100 to circulate cooling air for preventing overheating of the solid state components that power and control the application of RF energy to the cooking chamber 102. The second air circulation system may include an inlet array 152 that is formed at a bottom (or basement) portion of the oven body 150. In particular, the basement region of the oven body 150 may be a hollow cavity within the oven body 150 that is disposed below the cooking chamber 102. The inlet array 152 may include multiple inlet ports that are disposed on each opposing side of the oven body 150 proximate to the basement, and also on the front of the oven body 150 proximate to the basement. Portions of the inlet array 152 that are disposed on the sides of the oven body 150 may be formed at an angle relative to the majority portion of the oven body 150 on each respective side. In this regard, the portions of the inlet array 152 that are disposed on the sides of the oven body 150 may be tapered toward each other at an angle of about twenty degrees (e.g., between ten degrees and thirty degrees). This tapering may ensure that even when the oven 100 is inserted into a space that is sized precisely wide enough to accommodate the oven body 150 (e.g., due to walls or other equipment being adjacent to the sides of the oven body 150), a space is formed proximate to the basement to permit entry of air into the inlet array 152. At the front portion of the oven body 150 proximate to the basement, the corresponding portion of the inlet array 152 may lie in the same plane as (or at least in a parallel plane to) the front of the oven 100 when the door 104 is closed. No such tapering is required to provide a passage for air entry into the inlet array 152 in the front portion of the oven body 150 since this region must remain clear to permit opening of the door 104.

From the basement, ducting may provide a path for air that enters the basement through the inlet array 152 to move upward (under influence from a cool-air circulating fan) through the oven body 150 to an attic portion inside which control electronics (e.g., the solid state components) are located. The attic portion may include various structures for ensuring that the air passing from the basement to the attic and ultimately out of the oven body 150 via outlet louvers 154 is passed proximate to the control electronics to remove heat from the control electronics. Hot air (i.e., air that has removed heat from the control electronics) is then expelled from the outlet louvers 154. In some embodiments, outlet louvers 154 may be provided at right and left sides of the oven body 150 and at the rear of the oven body 150 proximate to the attic. Placement of the inlet array 152 at the basement and the outlet louvers 154 at the attic ensures that the normal tendency of hotter air to rise will prevent recirculation of expelled air (from the outlet louvers 154) back through the system by being drawn into the inlet array 152. As such, air drawn into the inlet array 152 can reliably be expected to be air at ambient room temperature, and not recycled, expelled cooling air.

Figure 2:
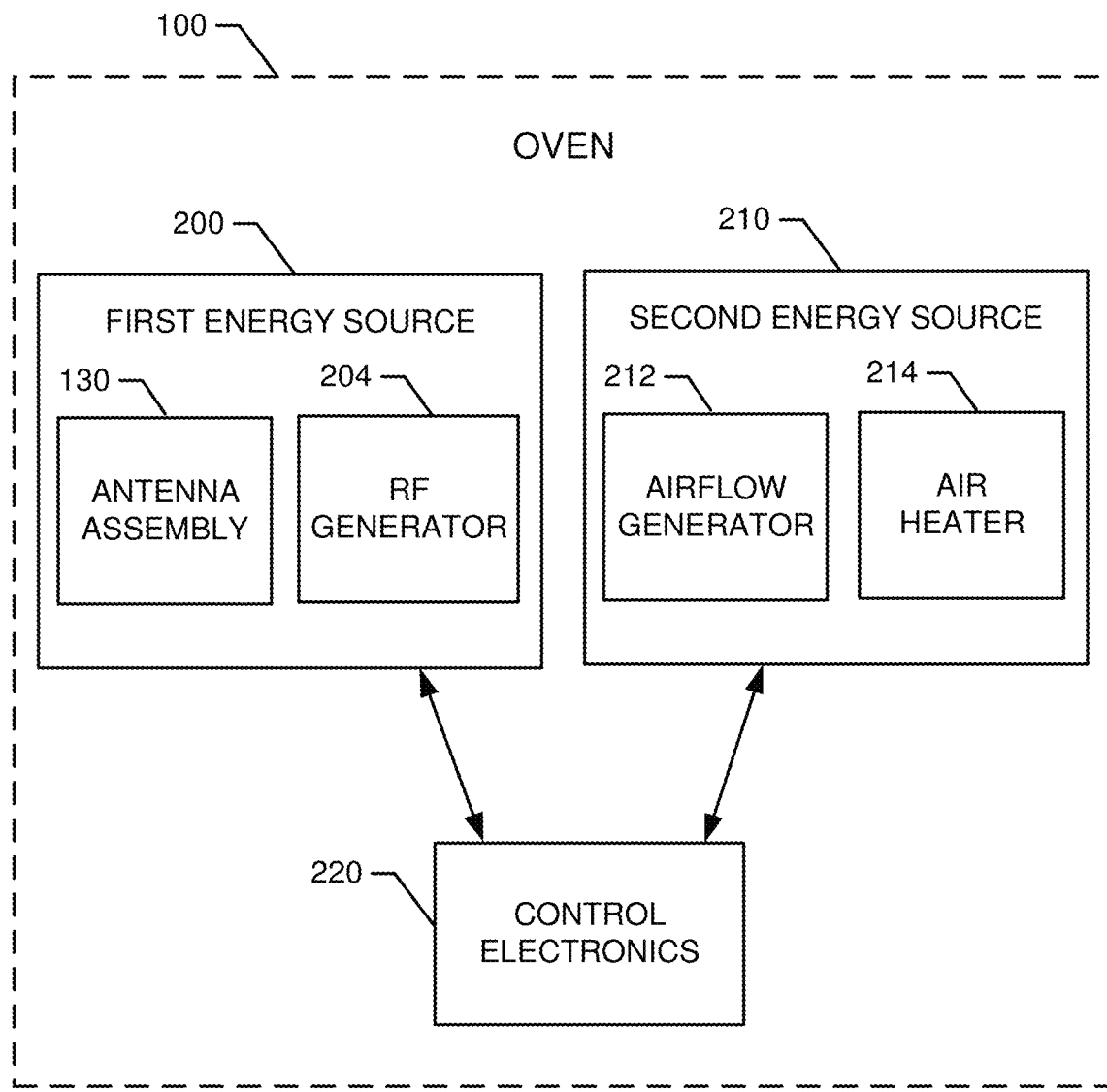
FIG. 2 illustrates a functional block diagram of the oven of FIG. 1 according to an example embodiment.

FIG. 2 illustrates a functional block diagram of the oven 100 according to an example embodiment. As shown in FIG. 2, the oven 100 may include at least a first energy source 200 and a second energy source 210. The first and second energy sources 200 and 210 may each correspond to respective different cooking methods. In some embodiments, the first and second energy sources 200 and 210 may be an RF heating source and a convective heating source, respectively. However, it should be appreciated that additional or alternative energy sources may also be provided in some embodiments.

As mentioned above, the first energy source 200 may be an RF energy source (or RF heating source) configured to generate relatively broad spectrum RF energy or a specific narrow band, phase controlled energy source to cook food product placed in the cooking chamber 102 of the oven 100. Thus, for example, the first energy source 200 may include the antenna assembly 130 and an RF generator 204. The RF generator 204 of one example embodiment may be configured to generate RF energy at selected levels and with selected frequencies and phases. In some cases, the frequencies may be selected over a range of about 6 MHz to 246 GHz. However, other RF energy bands may be employed in some cases. In some examples, frequencies may be selected from the ISM bands for application by the RF generator 204.

In some cases, the antenna assembly 130 may be configured to transmit the RF energy into the cooking chamber 102 and receive feedback to indicate absorption levels of respective different frequencies in the food product. The absorption levels may then be used to control the generation of RF energy to provide balanced cooking of the food product. Feedback indicative of absorption levels is not necessarily employed in all embodiments however. For example, some embodiments may employ algorithms for selecting frequency and phase based on pre-determined strategies identified for particular combinations of selected cook times, power levels, food types, recipes and/or the like. In some embodiments, the antenna assembly 130 may include multiple antennas, waveguides, launchers, and RF transparent coverings that provide an interface between the antenna assembly 130 and the cooking chamber 102. Thus, for example, four waveguides may be provided and, in some cases, each waveguide may receive RF energy generated by its own respective power module or power amplifier of the RF generator 204 operating under the control of control electronics 220. In an alternative embodiment, a single multiplexed generator may be employed to deliver different energy into each waveguide or to pairs of waveguides to provide energy into the cooking chamber 102.

In an example embodiment, the second energy source 210 may be an energy source capable of inducing browning and/or convective heating of the food product. Thus, for example, the second energy source 210 may a convection heating system including an airflow generator 212 and an air heater 214. The airflow generator 212 may be embodied as or include the heated-air circulation fan or another device capable of driving airflow through the cooking chamber 102 (e.g., via the air delivery orifices 112). The air heater 214 may be an electrical heating element or other type of heater that heats air to be driven toward the food product by the airflow generator 212. Both the temperature of the air and the speed of airflow will impact cooking times that are achieved using the second energy source 210, and more particularly using the combination of the first and second energy sources 200 and 210.

In an example embodiment, the first and second energy sources 200 and 210 may be controlled, either directly or indirectly, by the control electronics 220. The control electronics 220 may be configured to receive inputs descriptive of the selected recipe, food product and/or cooking conditions in order to provide instructions or controls to the first and second energy sources 200 and 210 to control the cooking process. In some embodiments, the control electronics 220 may be configured to receive static and/or dynamic inputs regarding the food product and/or cooking conditions. Dynamic inputs may include feedback data regarding phase and frequency of the RF energy applied to the cooking chamber 102. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), a selection of a recipe (e.g., defining a series of cooking steps) and/or the like.

In some embodiments, the control electronics 220 may be configured to also provide instructions or controls to the airflow generator 212 and/or the air heater 214 to control airflow through the cooking chamber 102. However, rather than simply relying upon the control of the airflow generator 212 to impact characteristics of airflow in the cooking chamber 102, some example embodiments may further employ the first energy source 200 to also apply energy for cooking the food product so that a balance or management of the amount of energy applied by each of the sources is managed by the control electronics 220.

In an example embodiment, the control electronics 220 may be configured to access algorithms and/or data tables that define RF cooking parameters used to drive the RF generator 204 to generate RF energy at corresponding levels, phases and/or frequencies for corresponding times determined by the algorithms or data tables based on initial condition information descriptive of the food product and/or based on recipes defining sequences of cooking steps. As such, the control electronics 220 may be configured to employ RF cooking as a primary energy source for cooking the food product, while the convective heat application is a secondary energy source for browning and faster cooking. However, other energy sources (e.g., tertiary or other energy sources) may also be employed in the cooking process.

In some cases, cooking signatures, programs or recipes may be provided to define the cooking parameters to be employed for each of multiple potential cooking stages or steps that may be defined for the food product and the control electronics 220 may be configured to access and/or execute the cooking signatures, programs or recipes (all of which may generally be referred to herein as recipes). In some embodiments, the control electronics 220 may be configured to determine which recipe to execute based on inputs provided by the user except to the extent that dynamic inputs (i.e., changes to cooking parameters while a program is already being executed) are provided. In an example embodiment, an input to the control electronics 220 may also include browning instructions. In this regard, for example, the browning instructions may include instructions regarding the air speed, air temperature and/or time of application of a set air speed and temperature combination (e.g., start and stop times for certain speed and heating combinations). The browning instructions may be provided via a user interface accessible to the operator, or may be part of the cooking signatures, programs or recipes.

Figure 3:
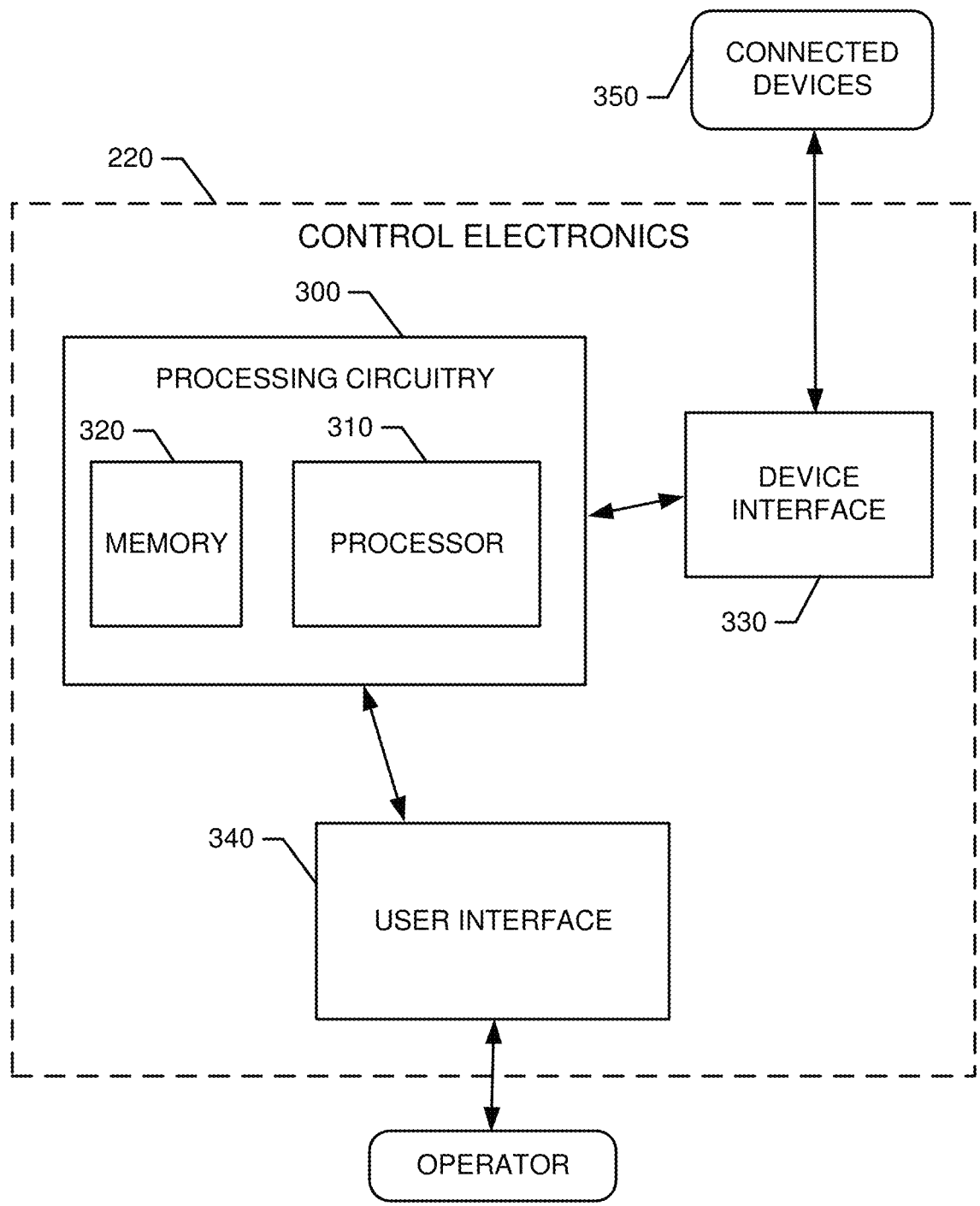
FIG. 3 illustrates a block diagram of control electronics according to an example embodiment.

FIG. 3 illustrates a block diagram of the control electronics 220 according to an example embodiment. In some embodiments, the control electronics 220 may include or otherwise be in communication with processing circuitry 300 that is configurable to perform actions in accordance with example embodiments described herein. As such, for example, the functions attributable to the control electronics 320 may be carried out by the processing circuitry 300.

The processing circuitry 300 may be configured to perform data processing, control function execution and/or other processing and management services according to an example embodiment of the present invention. In some embodiments, the processing circuitry 300 may be embodied as a chip or chip set. In other words, the processing circuitry 300 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 300 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 300 may include one or more instances of each of a processor 310 and memory 320 that may be in communication with or otherwise control a device interface 330 and a user interface 340. As such, the processing circuitry 300 may be embodied as a circuit chip (e.g., an integrated circuit chip) configured (e.g., with hardware, software or a combination of hardware and software) to perform operations described herein. However, in some embodiments, the processing circuitry 300 may be embodied as a portion of an on-board computer.

The user interface 340 (which may be embodied as, include, or be a portion of the interface panel 106) may be in communication with the processing circuitry 300 to receive an indication of a user input at the user interface 340 and/or to provide an audible, visual, mechanical or other output to the user (or operator). As such, the user interface 340 may include, for example, a display (e.g., a touch screen such as the interface panel 106), one or more hard or soft buttons or keys, and/or other input/output mechanisms.

The device interface 330 may include one or more interface mechanisms for enabling communication with connected devices 350 such as, for example, other components of the oven 100, sensors of a sensor network of the oven 100, removable memory devices, wireless or wired network communication devices, and/or the like. In some cases, the device interface 330 may be any means such as a device or circuitry embodied in either hardware, or a combination of hardware and software that is configured to receive and/or transmit data from/to sensors that measure any of a plurality of device parameters such as frequency, phase, temperature (e.g., in the cooking chamber 102 or in air passages associated with the second energy source 210), air speed, and/or the like. As such, in one example, the device interface 330 may receive input at least from a temperature sensor that measures the air temperature of air heated (e.g., by air heater 214) prior to introduction of such air (e.g., by the airflow generator 212) into the cooking chamber 102. Alternatively or additionally, the device interface 330 may provide interface mechanisms for any devices capable of wired or wireless communication with the processing circuitry 300. In still other alternatives, the device interface 330 may provide connections and/or interface mechanisms to enable the processing circuitry 300 to control the cool-air circulating fan, the RF generator 204 or other components of the oven 100.

In an exemplary embodiment, the memory 320 may include one or more non-transitory memory devices such as, for example, volatile and/or non-volatile memory that may be either fixed or removable. The memory 320 may be configured to store information, data, cooking signatures, programs, recipes, applications, instructions or the like for enabling the control electronics 220 to carry out various functions in accordance with example embodiments of the present invention. For example, the memory 320 could be configured to buffer input data for processing by the processor 310. Additionally or alternatively, the memory 320 could be configured to store instructions for execution by the processor 310. As yet another alternative, the memory 320 may include one or more databases that may store a variety of data sets responsive to input from the sensor network, or responsive to programming of any of various cooking programs. Among the contents of the memory 320, applications may be stored for execution by the processor 310 in order to carry out the functionality associated with each respective application. In some cases, the applications may include control applications that utilize parametric data to control the application of heat by the first and second energy sources 200 and 210 as described herein. In this regard, for example, the applications may include operational guidelines defining expected cooking speeds for given initial parameters (e.g., food type, size, initial state, location, and/or the like) using corresponding tables of frequencies, phases, RF energy levels, temperatures and air speeds. Thus, some applications that may be executable by the processor 310 and stored in memory 320 may include tables defining combinations of RF energy parameters and air speed and temperature to determine cooking times for certain levels of doneness and/or for the execution of specific cooking recipes. Accordingly, different cooking programs can be executed to generate different RF and/or convective environments to achieve the desired cooking results.

The processor 310 may be embodied in a number of different ways. For example, the processor 310 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 310 may be configured to execute instructions stored in the memory 320 or otherwise accessible to the processor 310. As such, whether configured by hardware or by a combination of hardware and software, the processor 310 may represent an entity (e.g., physically embodied in circuitry—such as in the form of processing circuitry 300) capable of performing operations according to example embodiments of the present invention while configured accordingly. Thus, for example, when the processor 310 is embodied as an ASIC, FPGA or the like, the processor 310 may be specifically configured hardware for conducting the operations described herein. Alternatively, as another example, when the processor 310 is embodied as an executor of software instructions, the instructions may specifically configure the processor 310 to perform the operations described herein.

In an example embodiment, the processor 310 (or the processing circuitry 300) may be embodied as, include or otherwise control the control electronics 220. As such, in some embodiments, the processor 310 (or the processing circuitry 300) may be said to cause each of the operations described in connection with the control electronics 220 by directing the control electronics 220 to undertake the corresponding functionalities responsive to execution of instructions or algorithms configuring the processor 310 (or processing circuitry 300) accordingly. As an example, the control electronics 220 may be configured to control air speed, temperature and/or the time of application of convective heat and control RF energy level, frequency and phase based on recipes, algorithms and/or the like in response to user input at the user interface 340. In some examples, the control electronics 220 may be configured to make adjustments to temperature and/or air speed or make adjustments to RF energy level, phase and/or frequency based on the cooking time, power, and/or recipe selected. Alternatively, the control electronics 220 may be enabled to make adjustments to cooking time based on the adjustment of either or both of the temperature/air speed and energy level/frequency/phase. In some cases, a separate instance of a processor (or processors) and memory may be associated with energy application (perhaps even distinctly separate between the first and second energy sources 200 and 210), and user interface.

In an example embodiment, the control electronics 220 may access instructions for control of the RF generator 204 and/or the antenna assembly 130 to control the application of RF energy to the cooking chamber 102. Thus, for example, the operator may provide static inputs to define the type, mass, quantity, or other descriptive parameters (e.g., a recipe) related to the food product(s) disposed within the cooking chamber 102. The control electronics 220 may then utilize the static inputs to locate an algorithm or other program for execution to define the application of RF energy and/or convective energy to be applied within the cooking chamber 102. The control electronics 220 may also monitor dynamic inputs to modify the amount, frequency, phase or other characteristics of the RF energy to be applied within the cooking chamber 102 during the cooking process.

Accordingly, for example, the control electronics 220 may be configured to extrapolate, calculate or otherwise determine the amount of energy to be directed into food product so that accurate cooking effects may be anticipated to maximize the quality of cooking. The control electronics 220 may then control operation of the RF generator 204 and/or the antenna assembly 130 based on the static and dynamic inputs provided. Thus, if different food items are located in the cooking chamber 102, the control electronics 220 may direct a desired amount of RF energy to the appropriate respective different food items to achieve the desired cooking results. In other words, the energy application could be provided in a manner that is at least somewhat specific to the food being cooked. Unlike a conventional microwave or combination oven, in which the user essentially selects a power level and time for application of RF energy and the RF energy is thereafter applied indiscriminately for the selected time at the corresponding power level regardless of the food product being cooked, example embodiments employ control over the specific frequencies and phases applied for the user selected power and time requirements based on the food product (or at least the recipe that corresponds to the food product) in the cooking chamber 102. Moreover, example embodiments employ a learning process to determine specific frequency and phase information to employ during the cooking process. The learning process may be executed either at the beginning of the RF application stage during a cooking process or repeatedly during the application of RF energy at various intervals during the cooking process. As such, for example, the user may select a power level and/or time for cooking, and the frequency and phase to be used for the cooking process may be selected automatically based on the employment of selected frequency and phase combinations that are determined by a learning process employed to receive feedback regarding how the specific food product placed in the cooking chamber 102 reacts with or to the RF energy being applied therein.

Furthermore, in some example embodiments, the control electronics 220 may be configured to determine a cooking impact that heat addition associated with convective heating may provide to an already calculated cook time associated with another energy source (e.g., the first energy source 200). Thus, for example, if a cook time is determined for cooking relative to heating applied by the first energy source 200, and adjustments or inputs are made to direct usage of the second energy source 210, the control electronics 220 may be configured to calculate adjustments (and apply such adjustments) to the application of the first energy source 200 in order to ensure that the cooking operation does not overcook or overheat the food product.

As discussed above, in some embodiments, the control electronics 220 may be configured to perform a learning step or process to enable information to be learned about the location and/or absorption characteristics of the food product within the cooking chamber 102. The phase and frequency may then be selected and/or controlled to provide different amounts, frequencies, phases, etc., of RF energy to be directed to different portions of the cooking chamber 102 to correspond to the foods located in the cooking chamber 102. In some embodiments, the control electronics 220 may be configured to adjust calculations regarding the times and/or amounts of RF energy to be applied to achieve a certain level of doneness (e.g., associated with a corresponding amount of energy absorption) based on oven 100 configuration as indicated by the learning process.

In some cases, the processing circuitry 300 may convert user input provided via the user interface 340 into instructions for control of the first and second energy sources 200 and 210 based on stored algorithms or other programs, as described herein. In this regard, for example, the user interface 340 may provide one or more screens or interface consoles that enable inputs to be provided and thereafter processed in corresponding ways that enable the control capabilities of the oven 100 to be optimally employed. These screens or interface consoles may therefore define a workflow that enables unique capabilities for the operation of the oven 100 and user experience in interacting with the oven 100.

FIGS. 4-18 illustrate some examples of specific screens or interface consoles to facilitate discussion of the workflow control and user experience that is achievable using example embodiments. The screens or interface consoles shown in FIGS. 4-18 may be provided at the interface panel 106 via operation of the control electronics 220 (and in particular operations or interactions with or by the user interface 340).

Figure 4:
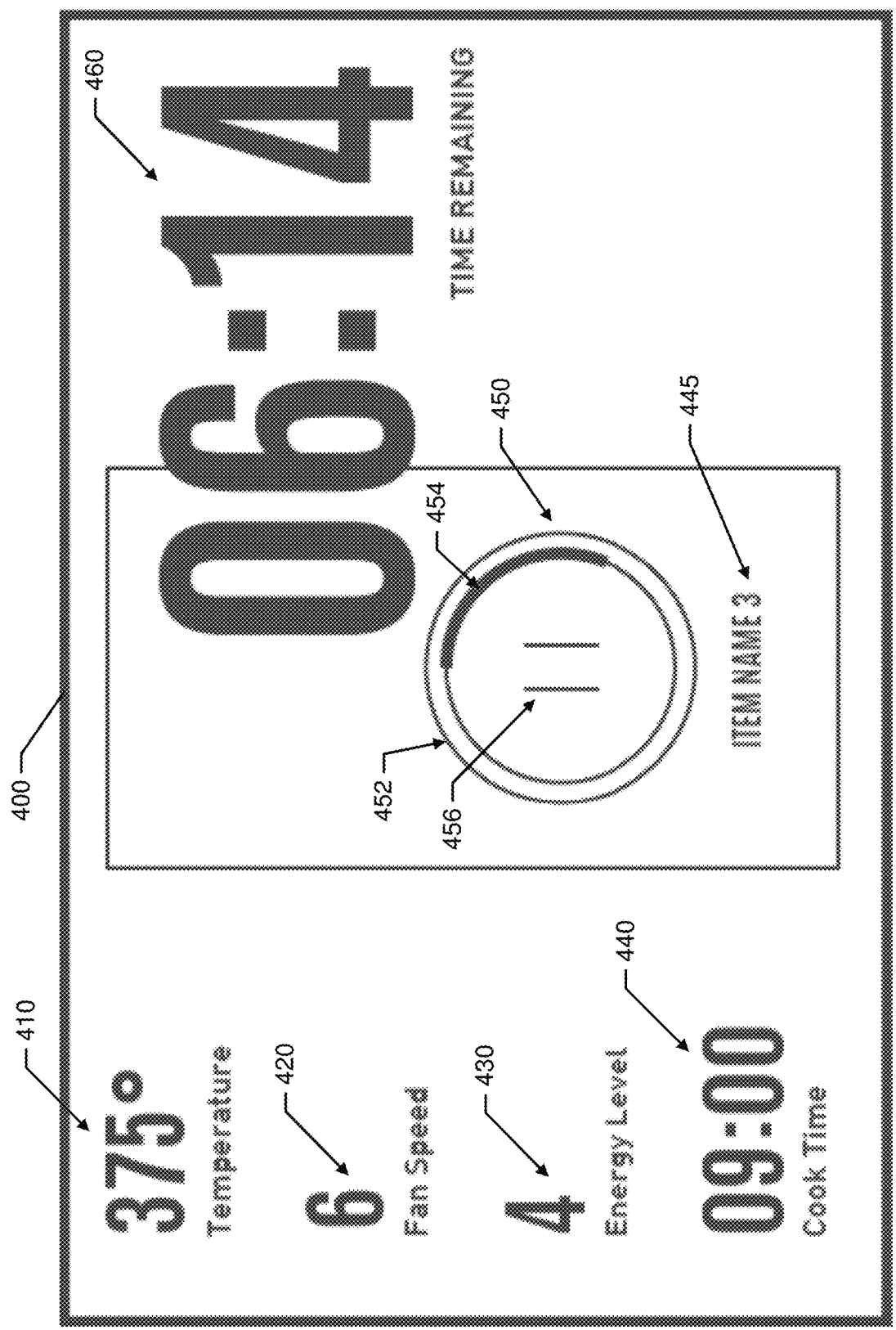
FIG. 4 illustrates a control console that may be displayed during execution of a cooking program according to an example embodiment.

FIG. 4 shows an interface console 400 presented during the process of cooking in accordance with an example embodiment. As shown in FIG. 4, while cooking is in progress, a number of indications regarding the cooking process may be provided. In this regard, for example, an oven temperature indicator 410 may be provided to show the current set temperature of the oven. A fan speed indicator 420 may also be provided to show the current speed of the fan of the airflow generator 212 that is associated with the second energy source 210. An energy level indicator 430 is provided to show the current energy level output of the RF generator 204 into the cooking chamber 102. A cook time indicator 440 is also provided to show the total cook time defined either manually by the user or responsive to user selection of a particular recipe or cooking program. A cooking program (or recipe) indicator 445 may be provided to indicate an item, program or recipe name for the program being executed.

In an example embodiment, the oven temperature indicator 410, the fan speed indicator 420, the energy level indicator 430 and the cook time indicator 440 may be provided along one side of the interface console 400 and some or all of the indicators may be selectable to transition to another interface console associated with making modifications to the corresponding settings associated with such indicators (as will be discussed in greater detail below). The cooking program indicator 445 may be provided adjacent to the oven temperature indicator 410, the fan speed indicator 420, the energy level indicator 430 and the cook time indicator 440 in a separate console or portion of the interface console 400. The cooking program indicator 445 identifies the name (and in some cases also an image) associated with item, program or recipe being executed, or ready to be executed (e.g., selected).

In an example embodiment, a combined progress indicator and control operator 450 may be provided for the item, program or recipe being executed or ready to be executed. The combined progress indicator and control operator 450 provides a single icon or indicator configured to show current progress relative to a representation of a full commitment of time to complete the selected cooking program in combination with a selectable operator for controlling (e.g., starting, stopping, pausing, or the like) progress toward achieving completion of the selected cooking program. In particular, the combined progress indicator and control operator 450 includes a goal indicator 452 in the form of a geometric shape (e.g., a circle) having a perimeter that represents, is indicative of or otherwise corresponds to the full commitment of time to complete the selected cooking program. The combined progress indicator and control operator 450 further includes a progress indicator 454 that extends while following the shape of the goal indicator 452 proportional to the fraction of the full commitment of time that has already been accomplished or completed. Thus, in the example shown, the goal indicator 452 defines a perimeter of a circle where the perimeter represents a nine minute time period (corresponding to the cook time indicator 440). A time remaining indicator 460 shows that six minutes and fourteen seconds remain to complete the selected cooking program. Accordingly, more than two thirds of the cooking time is still remaining. The progress indicator 454 therefore extends along a portion of the goal indicator 452 that is slightly less than one third of the total perimeter of the goal indicator 452. Thus, the progress indicator 454 visually demonstrates the percentage of the full time commitment that has been completed based on the proportional amount of the goal indicator 452 that is consumed or taken up by the progress indicator 454. In some cases, the progress indicator 454 extends clockwise along the goal indicator 452, but the reverse direction (i.e., counterclockwise) could be used in some alternatives. Additionally, although the illustrated example provides for the progress indicator 454 to begin at the 12 o'clock position and extends clockwise, any other suitable starting position could be selected in various alternatives.

Meanwhile, the goal indicator 452 extends around and entirely surrounds the control operator 456, which controls progress of cooking (or at least the application of RF energy). The control operator 456 may be a typical icon symbol for start, stop, pause, repeat or other useful functions, or may indicate progress via color (e.g., green, red, yellow, etc.) based on actuation of the control operator 456 by the user. For example, if a cooking program is currently running (such that the time remaining is reducing while the progress indicator 454 grows in size to show the fraction of the cook time that remains (is not filled) or has been completed (is filled)), the pause icon may be presented as the control operator 456 to allow the operator to pause the cooking program. Meanwhile, if the cooking program is paused, a start icon may be provided as the control operator 456 to allow the operator to resume the cooking program. If the cooking program has completed, a repeat icon may be provided as the control operator 456 to allow the user to initiate repeating of the cooking operation (at which point the time remaining would match the cook time and the progress indicator 454 would go to zero and begin to grow as the time remaining counts down during the subsequent execution of the cooking program again.

The combined progress indicator and control operator 450 provides for control of function execution based on provision of a graphic representation of the function that is to be performed such that the graphic representation of the function that is to be performed is framed by simultaneous presentations of a fixed representation of the full commitment of time for the cooking program selected and a dynamic representation of the progress toward completion of that full commitment. In other words, a user selectable graphic for control of a function associated with executing a cooking program is surrounded by a non-user selectable (and automatically generated and reconfigured) graphic representation of the progress toward completion of the cooking program.

In the example of FIG. 4, the goal indicator 452 is a hollow circular annulus defined by two concentric circles. However, as indicated above, the goal indicator 452 could also take other shapes. Moreover, in the example of FIG. 4, the progress indicator 454 fills a portion of the circular annulus by widely tracing along the inner circle. However, complete filling of the circular annulus or other paradigms for showing completion percentage relative to the full time commitment could also be employed in other alternative embodiments.

Figure 5:
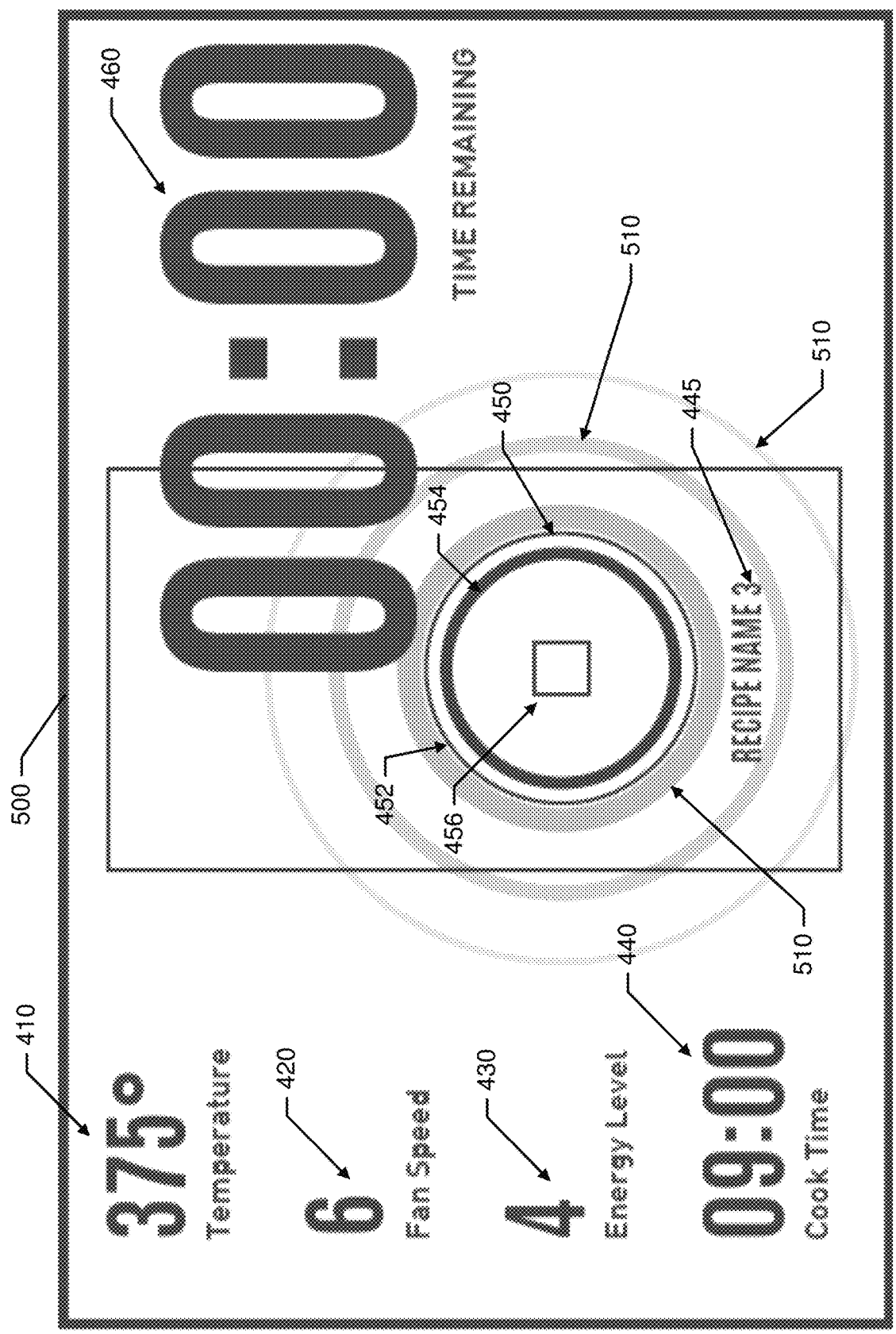
FIG. 5 illustrates the control console responsive to completion of execution of a cooking program according to an example embodiment.

FIG. 5 shows a control console 500 that may be presented when a cooking program is completed. As shown in FIG. 5, the progress indicator 454 has achieved full completion of the goal indicator 452, as the time remaining indicator 460 has reduced to zero. The time remaining indicator 460 may generally present a solid display of the numbers as the time counts down, but the time remaining indicator 460 may flash when zero is reached. As a further indication of the completion of the cooking program, the combined progress indicator and control operator 450 may generate a visual and/or audible alert (e.g., pulsating alert). In this regard, for example, pulse rings 510 may be generated to expand away from the goal indicator 452 with successively larger diameter rings of successively thinner width as the distance from the center of the goal indicator 452 increases.

Figure 6:
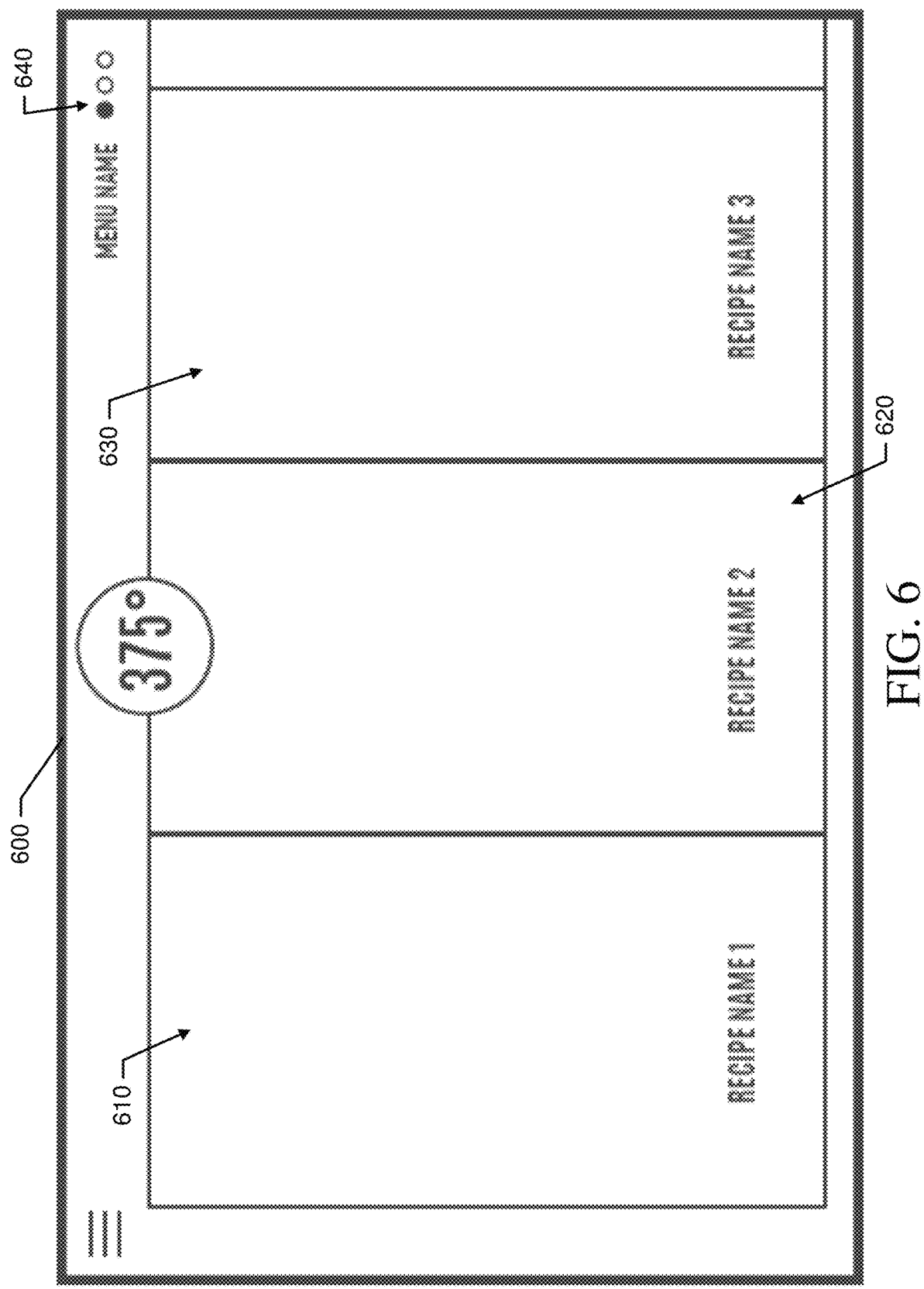
FIG. 6 illustrates a home screen for cooking program selection according to an example embodiment.

In an example embodiment, the control consoles 400 and 500 of FIGS. 4 and 5 may be reached by selecting a recipe from a recipe selection screen 600 as shown in FIG. 6. The recipe selection screen 600 may act as a home screen, and may show a predetermined number of cooking programs (or recipes) that are stored or otherwise executable by the oven 100. In this example, a first recipe 610, a second recipe 620, and a third recipe 630 are each shown. Images, names, or other differentiating details regarding each recipe may be presented in a corresponding window or portion of the recipe selection screen 600. The user can slide or swipe a finger to the left or right to see additional recipes. A page indicator 640 may indicate a representation of a location of the present set of displayed recipes relative to other pages of recipes.

Figure 7:
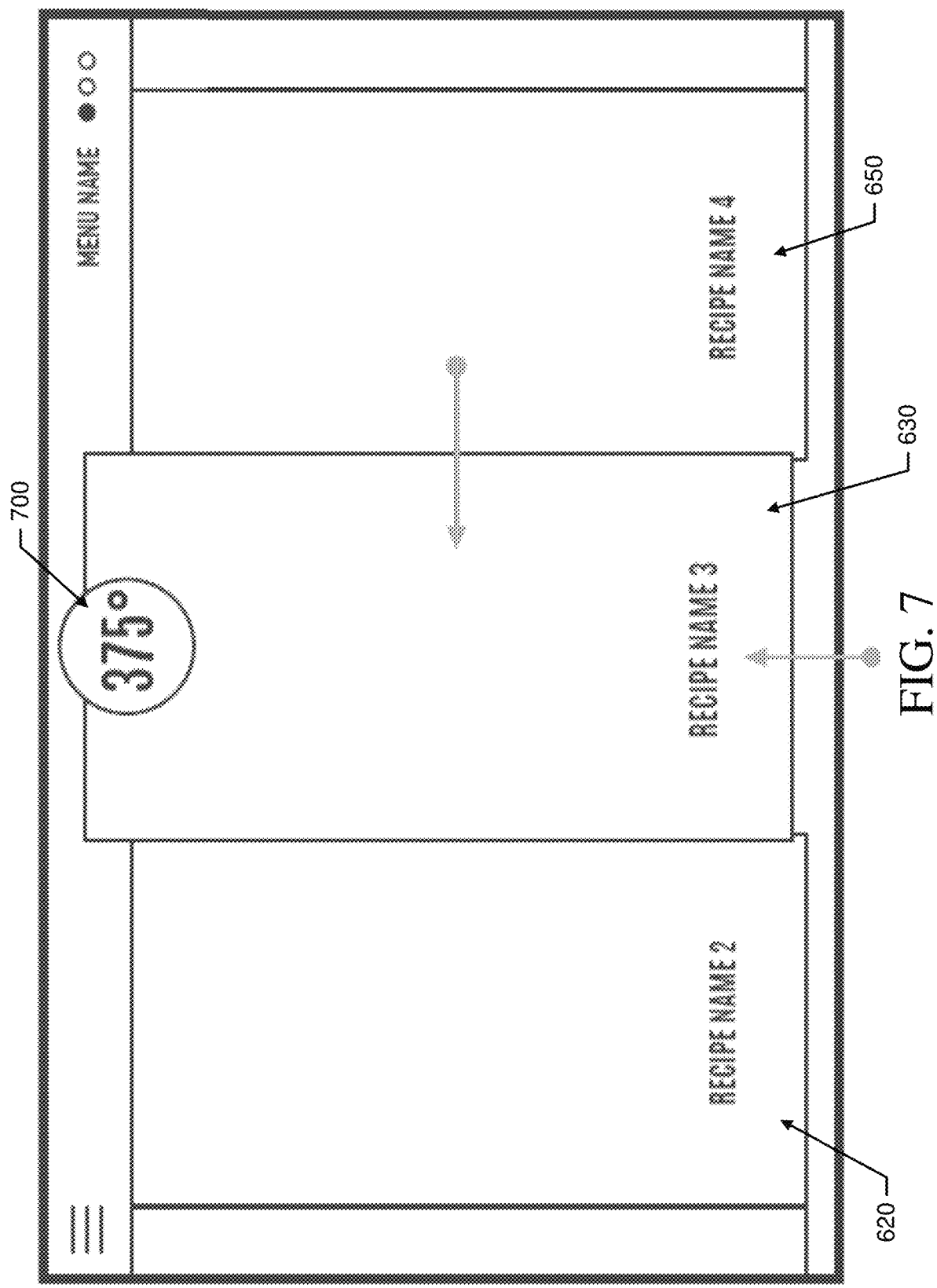
FIG. 7 illustrates the home screen after selection of a specific recipe or cooking program according to an example embodiment.

If the user taps or selects a specific one of the recipes, the selected recipe may become enlarged and move to the center as shown in FIG. 7. By selecting the third recipe 630, the third recipe 630 has been enlarged or moved forward, and has also been moved to the center. The movement of the third recipe 630 to the center also requires that a fourth recipe 650 is now displayed on the same page as well. A cooking temperature indicator 700 is shown for each recipe that is located in the center of the display. The cooking temperature indicator 700 shows a nominal value that is selectable to be changed by adjustment responsive to selecting the cooking temperature indicator.

Figure 8:
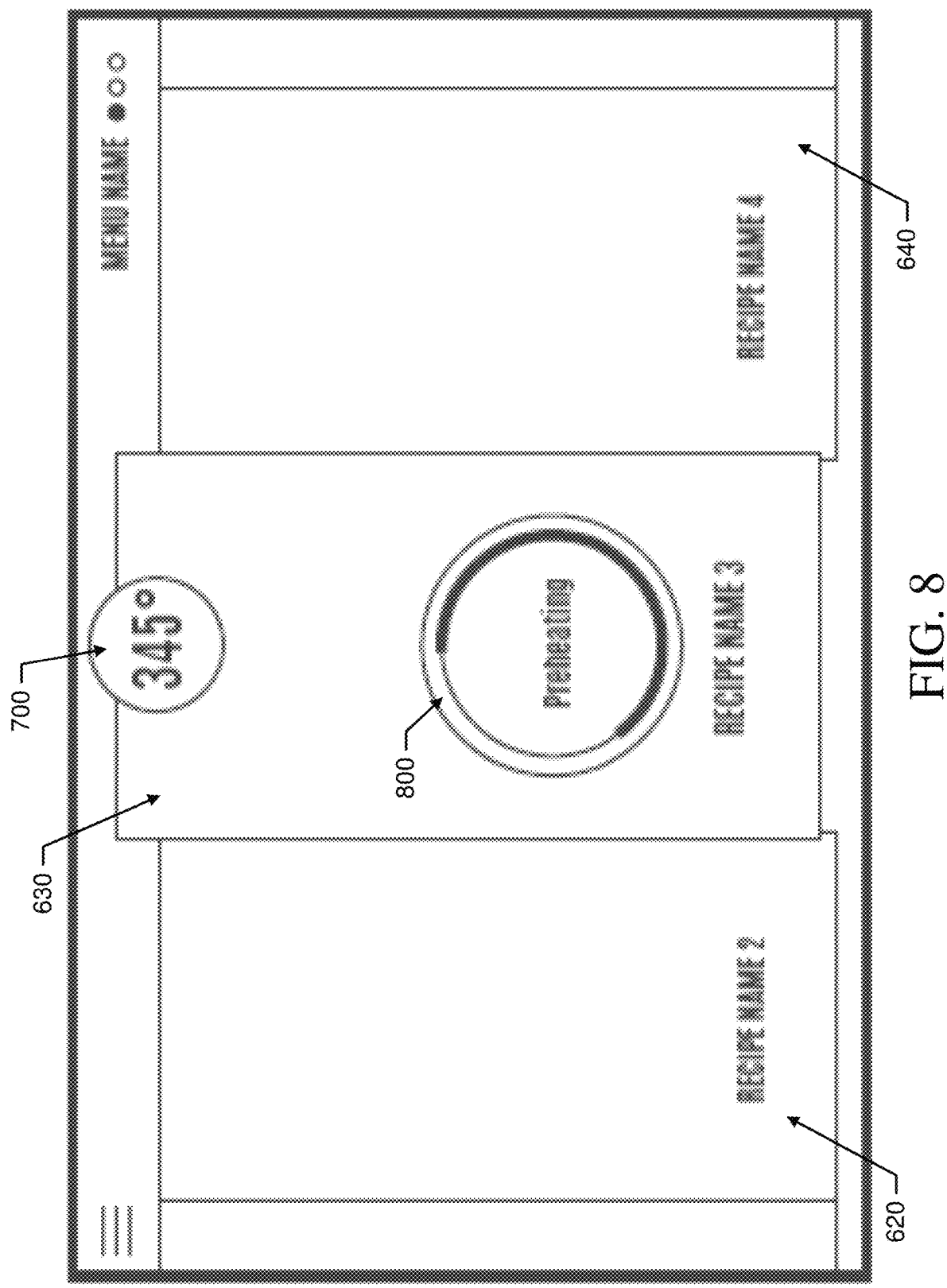
FIG. 8 illustrates the home screen during preheating according to an example embodiment.

After the user selects one of the recipes (e.g., the third recipe in this example), a preheat operator 800 may be presented. The preheat operator 800 is shown in FIG. 8 and resembles a preheat version of the combined progress indicator and control operator 450. In this regard, the preheat operator 800 includes a graphical display of the progress toward completing the preheat operation in the same manner described above. However, instead of having a control operator inside, an indication of the function being performed (e.g., preheating) is displayed.

Figure 9:
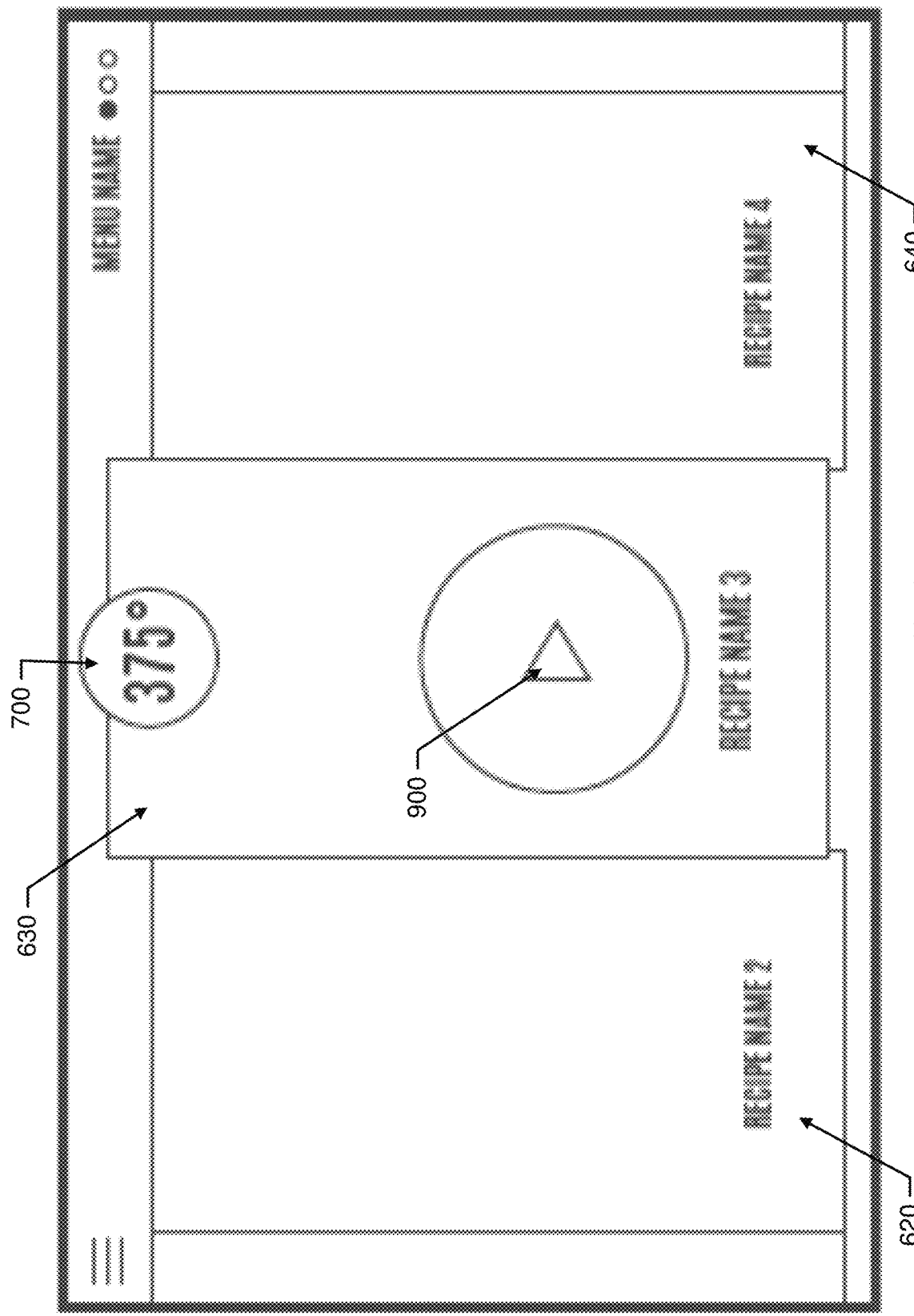
FIG. 9 illustrates the home screen after preheating according to an example embodiment.

Once the preheating temperature goal is achieved, a start icon 900 may be displayed on the selected recipe and the cooking temperature indicator 700 may match the desired preheat temperature as shown in FIG. 9. Selection of the start icon 900 may launch the cooking process and shift to the screens shown in FIGS. 4 and 5, for example. In some cases, the cooking temperature indicator 700 may flash or change color to further indicate that the desired preheat temperature has been achieved.

Figure 10:
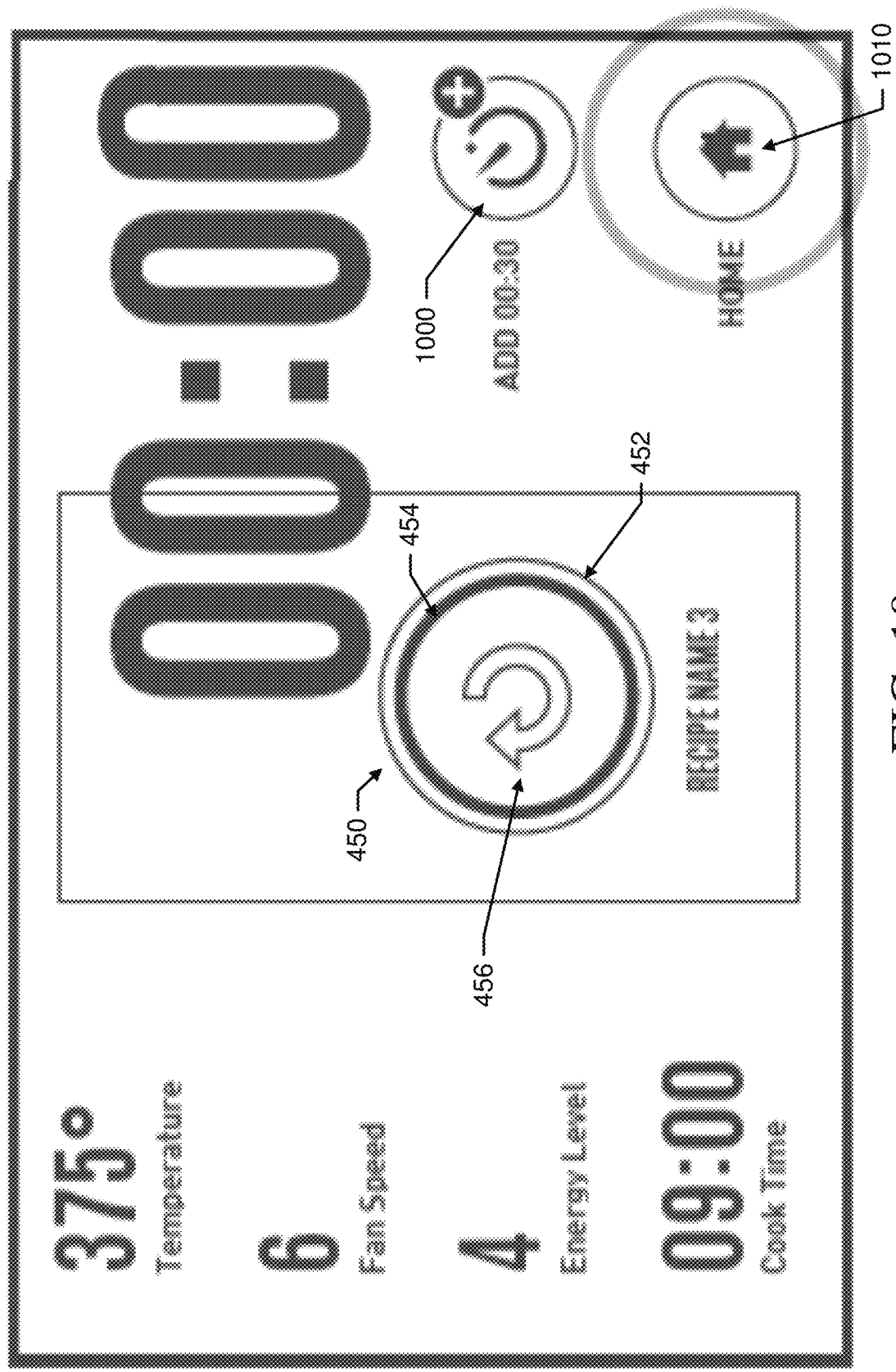
FIG. 10 illustrates the control console responsive to completion of execution of a cooking program where repeating the cooking program or adding cooking time is provided as an option according to an example embodiment.

Cooking may proceed in the manner described above in reference to FIGS. 4 and 5 until the recipe or cooking program is completed (as shown in FIG. 5). Thereafter, once the pulsating alert of FIG. 5 is complete, the combined progress indicator and control operator 450 may show a full progress indicator 454 and the control operator 456 may provide an option to repeat the execution of the cooking program as shown in FIG. 10. An add time indicator 1000 may be selectable to add an additional present amount of time (e.g., 30 seconds) to the cooking time. A home indicator 1010 may also be provided to allow the user to return to the home screen of FIG. 6.

Figure 11:
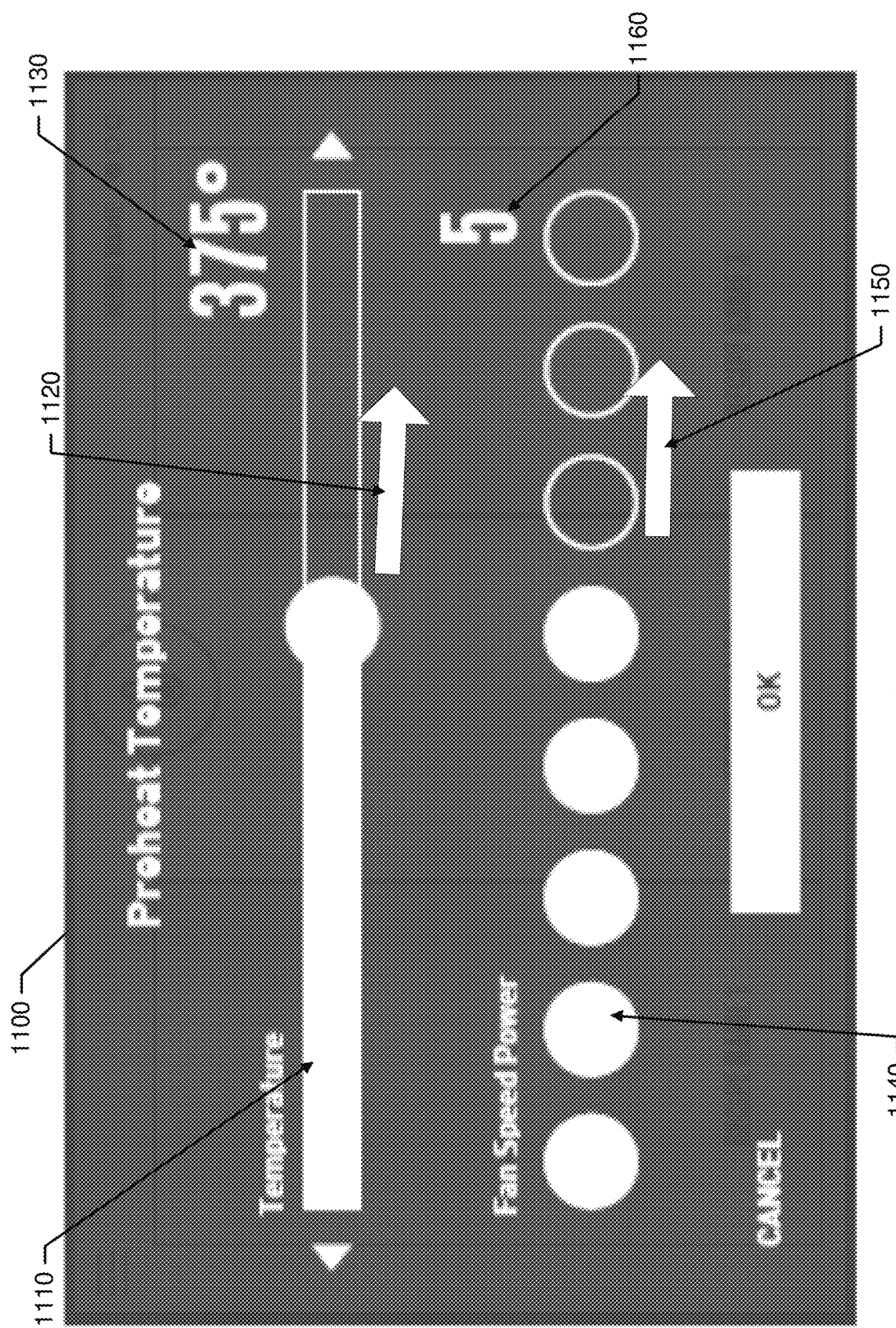
FIG. 11 illustrates a parameter selection screen for defining preheating parameters according to an example embodiment.

As discussed above, selection of various indicators may launch other selection screens to enable the corresponding parameters to be adjusted. FIG. 11 illustrates an adjustment screen 1100 for adjusting preheat temperature and/or fans speed. However, it should be appreciated that the adjustment screen 1100 could include just a single parameter or additional parameters in alternative embodiments. Moreover, the adjustment screen 1100 (or an alternative screen similar thereto (e.g., see FIG. 17)) could be for adjusting cooking parameters instead of preheating parameters.

In any case, generally speaking, the adjustment screen 1100 may include slidable indicators for adjusting corresponding parameters. In the example of FIG. 11, a temperature adjuster 1110 is provided and can be slid in the direction of arrow 1120 to increase temperature, or in the opposite direction to reduce temperature. The current setting 1130 is shown proximate to the temperature adjuster 1110. Similarly, a speed adjuster 1140 is provided and can be slid in the direction of arrow 1150 to increase fan speed, or in the opposite direction to reduce fan speed. The current setting 1160 is shown proximate to the speed adjuster 1140.

Figure 12:
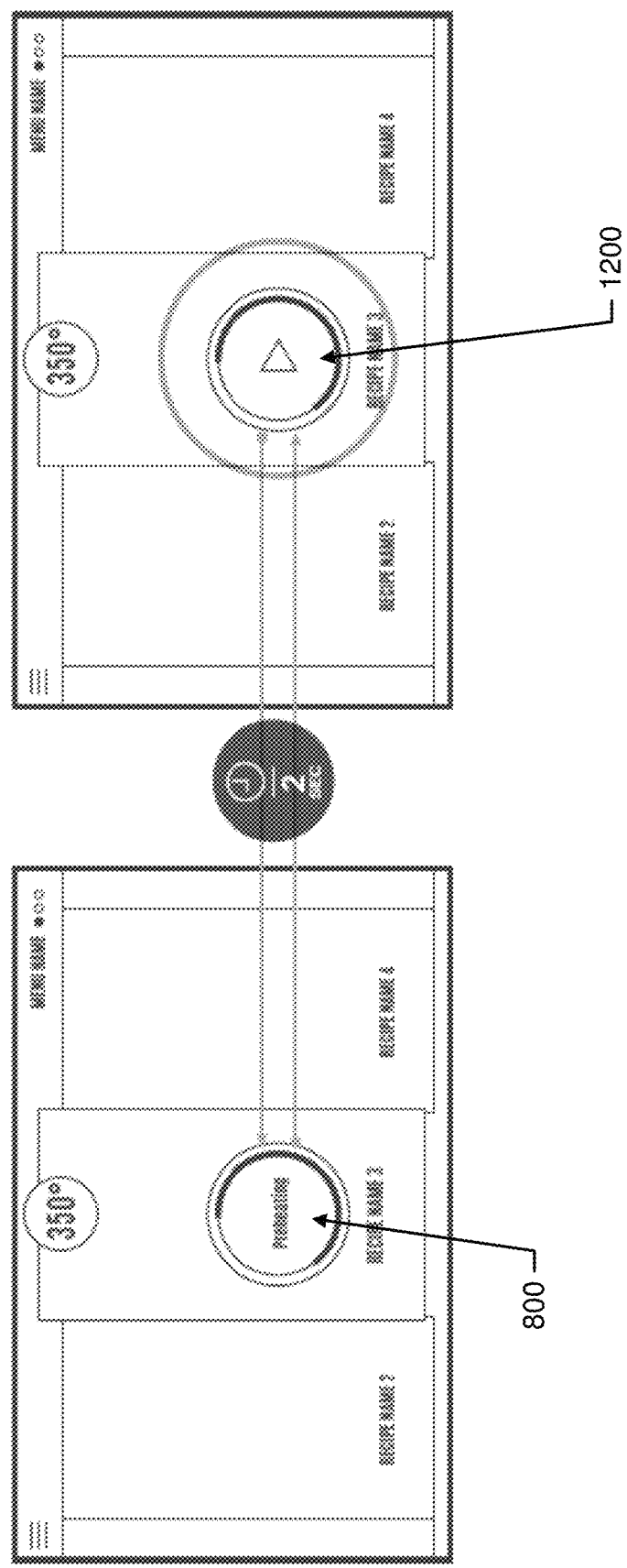
FIG. 12 illustrates the possibility to skip full completion of preheating and instead progressing to the cooking process according to an example embodiment.
Figure 13:
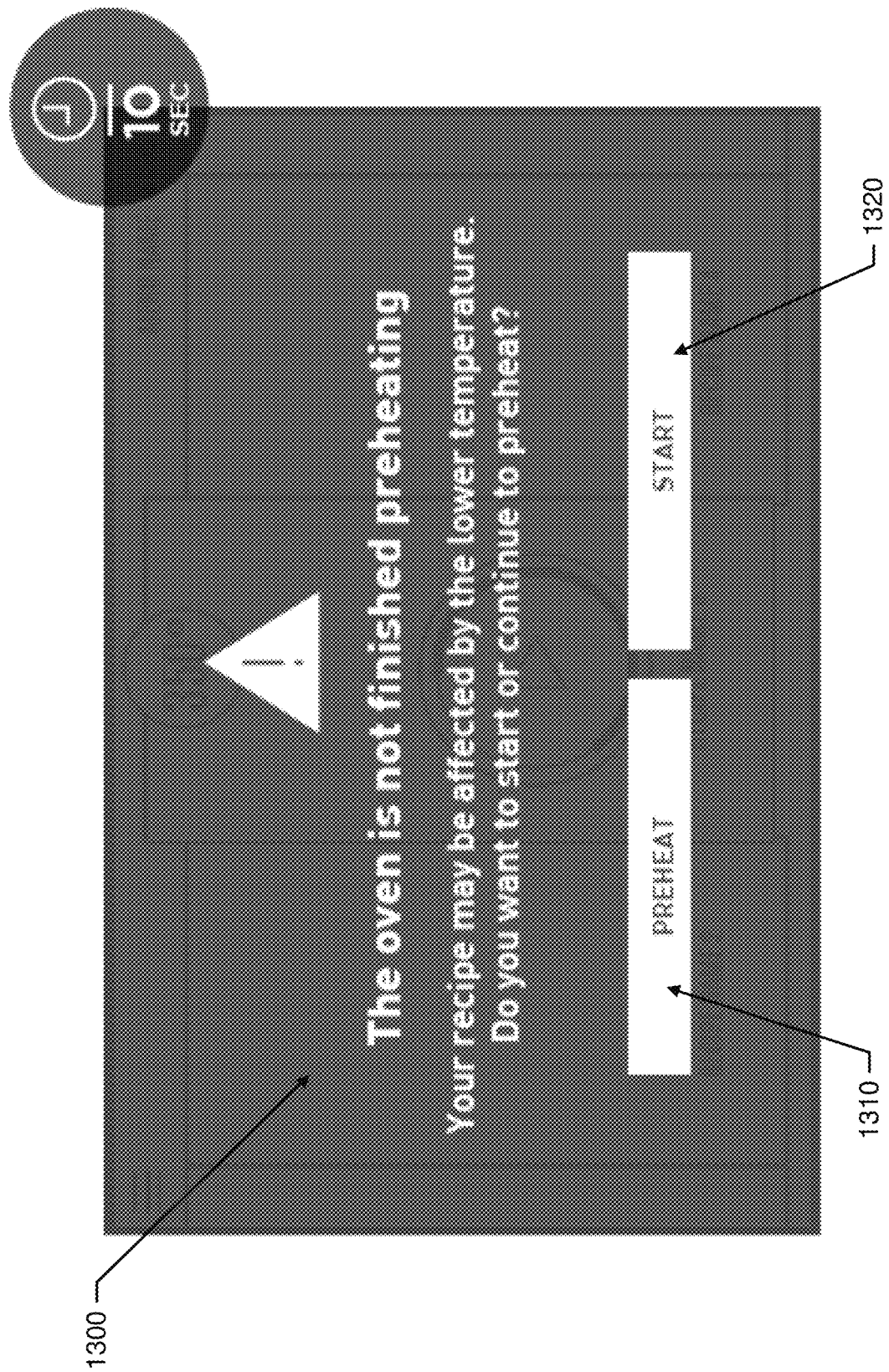
FIG. 13 illustrates an overlay provided as a warning to the operator when preheating is interrupted according to an example embodiment.

While preheating is in progress, the user may decide to initiate cooking before preheating is fully complete. FIG. 12 shows such a sequence. To accomplish this, the user may press the preheat operator 800 to obtain a control operator 1200 for starting the cooking program. If, after acquiring the control operator 1200, the user does not select the control operator 1200 within a predetermined period of time (e.g., 6 seconds), then the preheat operator 800 may return. In some cases, where the user proceeds without completing the preheating process, a warning 1300 may be generated (e.g., by the user interface 340) as an overlay before the operator is allowed to proceed as shown in FIG. 13. The warning 1300 may indicate that the starting of the cooking program prior to achieving the target preheat temperature may affect the recipe. The warning 1300 may be presented for a predetermined period of time (e.g., 10 seconds). However, in the meantime, the user may be enabled to select an option to continue preheating 1310 or an option to start cooking 1320.

Thus, as can be appreciated from the example of FIG. 13, any action by the user that may interrupt a process (e.g., a cooking process or preheating process) may receive a response in the form a warning indicating the impact of the interruption. The response may further enable the user to continue with the action or return to the normal work flow to avoid the identified impact.

Figure 14:
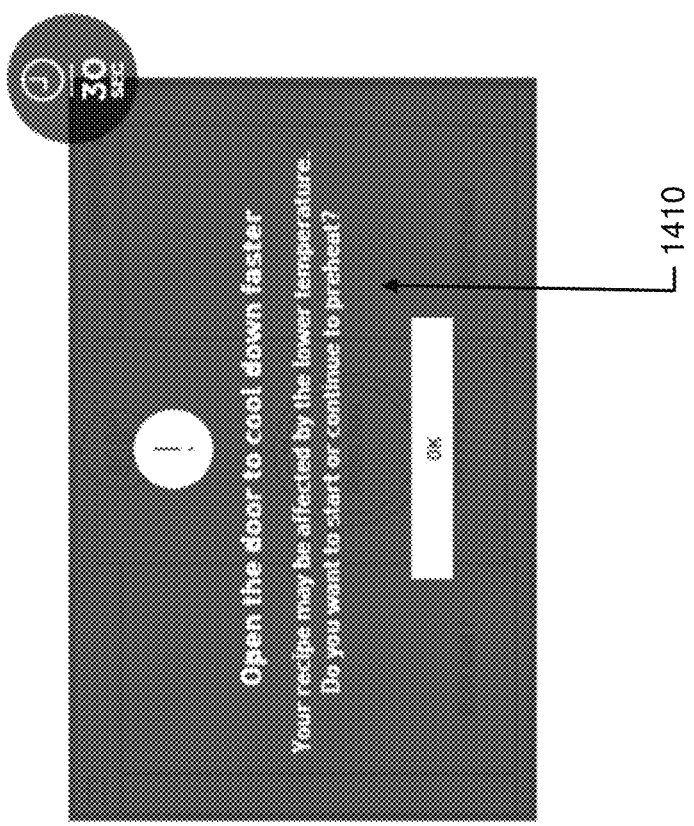
FIG. 14 illustrates the home screen during cooldown including recommendations for speeding cooldown according to an example embodiment.
Figure 14:
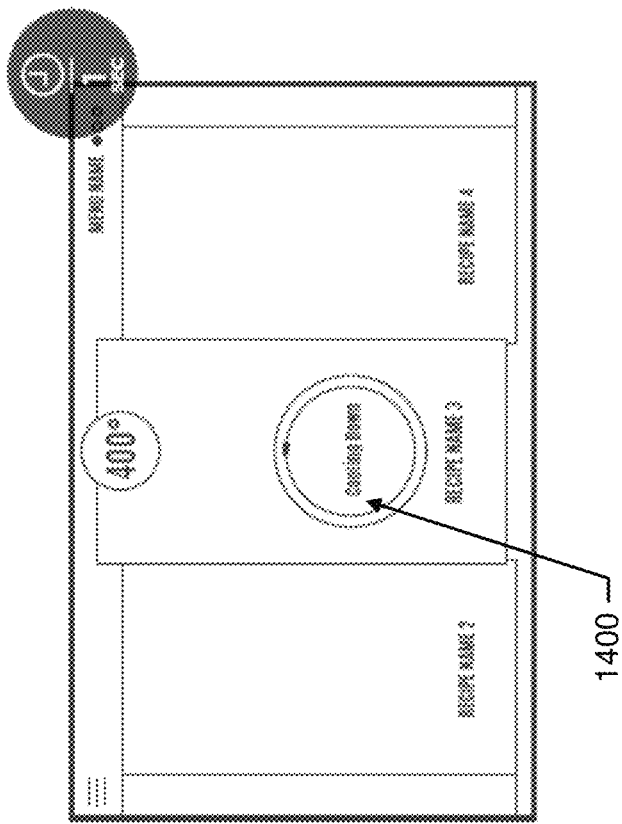

In other cases, the user may receive recommendations for improving the performance of certain processes. FIG. 14 illustrates such an example. In this regard, FIG. 14 illustrates the home screen displaying a status indicator 1400 for cooling down of the cooking chamber 102 after the cooking program has completed (assuming no further cooking is to be performed). As can be seen by the status indicator, the cooling down process is just getting started. The control electronics 220 may recognize that the cooling down process is underway and could be improved (i.e., sped up) by opening the door 104. Accordingly, an overlay 1410 may be provided to suggest to the user that the door 104 could be opened to cool down faster. However, the overlay 1410 may also indicate that any recipe could be affected by the lower temperature. Predetermined time periods of delay may be inserted before presentation of the suggestion in the overlay 1410 (e.g., 1 second), and before removal of the overlay 1410 (e.g., 30 seconds) if the user does not take any action. However, in some cases, overlays or other messages may remain until acknowledged by the user. As such, the control electronics 220 (e.g., via the user interface 340) may be configured to detect an operational situation and provide an elective action instruction to the user that may enhance or improve the operational situation. Such elective action instructions may be removed after either a predetermined period of time, or after acknowledged by the user.

Figure 15:
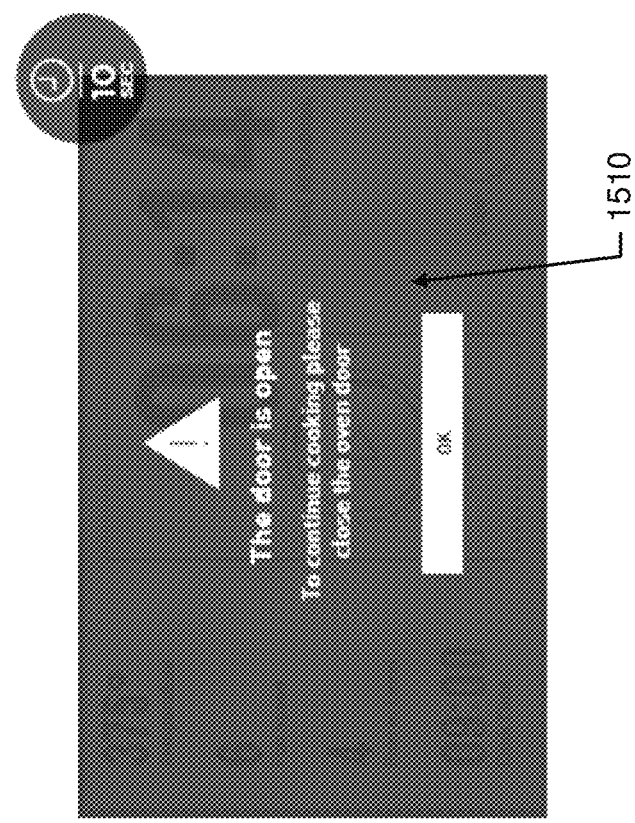
FIG. 15 illustrates detection of an adverse condition and recommendation to correct the adverse condition according to an example embodiment.
Figure 15:
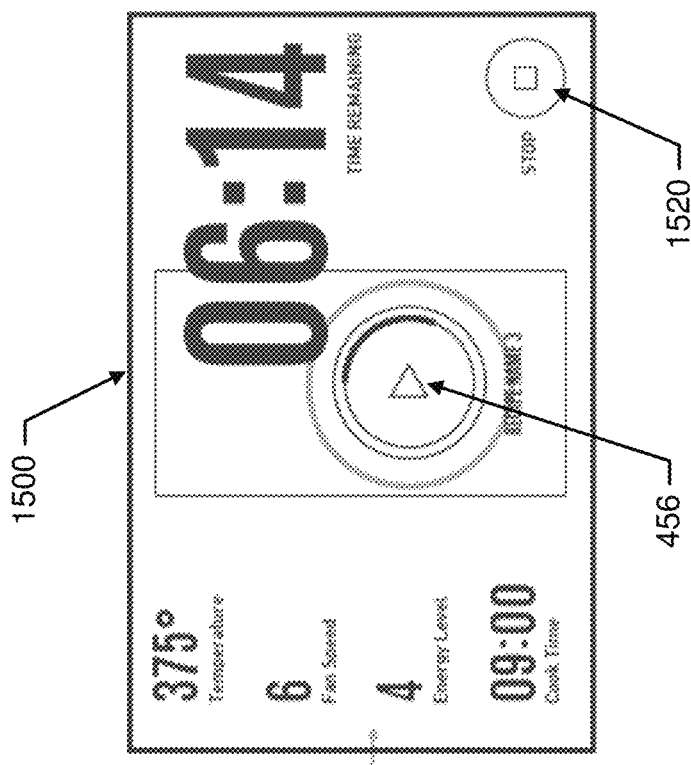

In still other examples, the control electronics 220 may be configured to detect situations (i.e., an adverse operating condition) that may negatively impact the cooking program and provide instructions or a recommendation for correcting the adverse operating condition. For example, as shown in FIG. 15, if the door 104 is opened during execution of a cooking program (as indicated by the progress indicator 454), the interface console 1500 may be as shown in FIG. 15 until the adverse operating condition is detected. Upon detection of the adverse operating condition (i.e., the door 104 being open for longer than a predetermined time period while a cooking program is being executed), the cooking program may be stopped or paused and the control operator 456 may provide the ability to select a start icon to resume the cooking program. However, a warning may be provided as an overlay 1510. The warning may provide a recommendation to close the door to continue cooking. The overlay 1510 may be presented for a predetermined length of time (e.g., 10 seconds) before it disappears, or the overlay 1510 may only be removed responsive to user action. However, the overlay 1510 can be acknowledged while displayed to remove the overlay 1510 sooner. Whether the overlay 1510 is removed by timing out or by acknowledgement, the interface console 1500 may be presented with termination option 1520 enabling the user to stop the cooking program. However, the user may also override the pausing of the cooking program by selecting the control operator 456 to continue execution of the cooking program.

Figure 16:
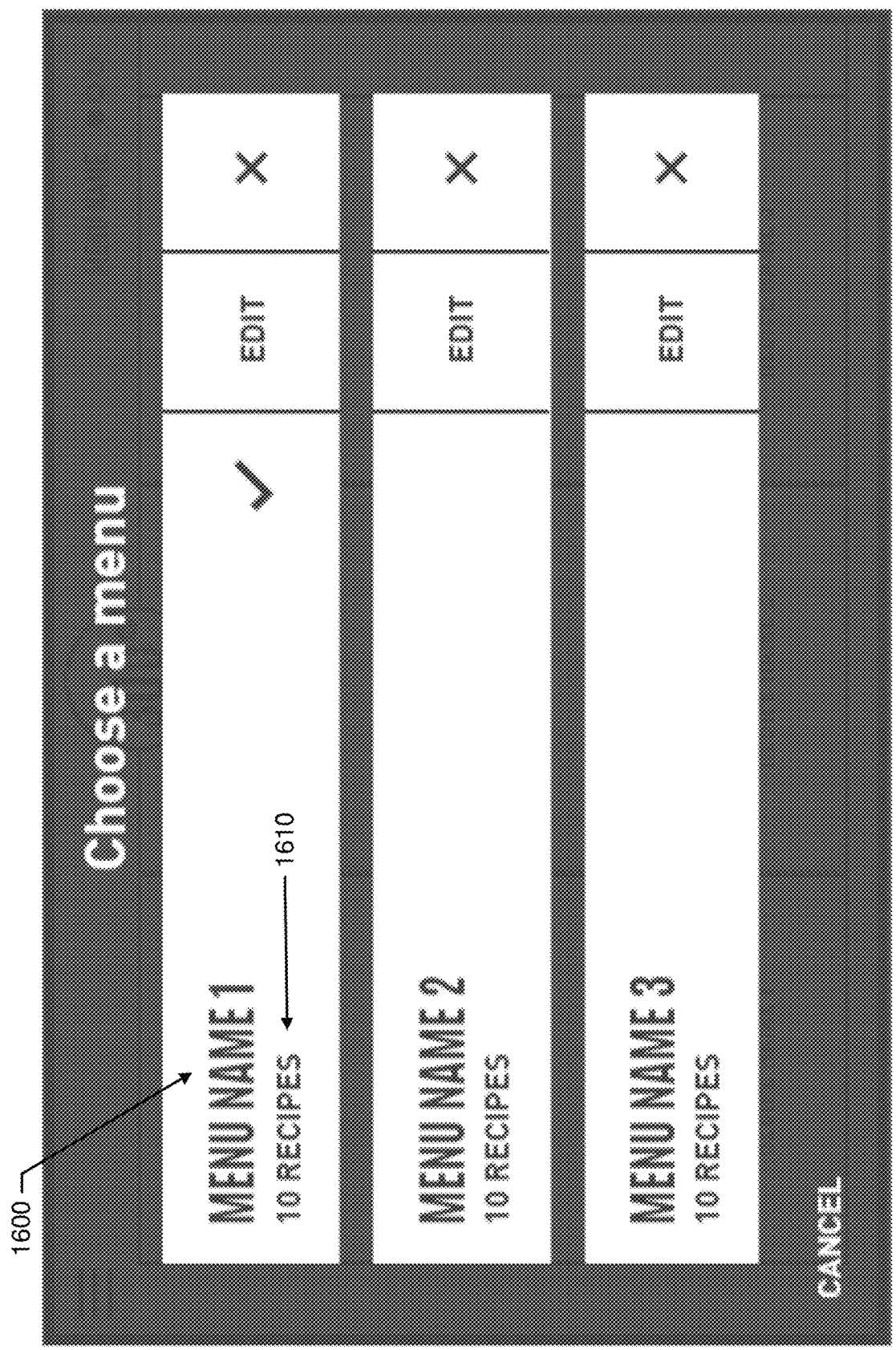
FIG. 16 illustrates a menu item selection screen according to an example embodiment.

The user interface 340 may also allow the user to interact with the oven 100 for the defining and/or selection of recipes (e.g., cooking programs). The recipes may be organized by any of a variety of different hierarchical and/or typological organization methods. In some cases, recipes may be organized in alphabetical order by type, with subdivisions further organized within each type in alphabetical order. FIG. 16 shows a generic organizational structure that may be presented on the interface panel 106 in some cases. A plurality of menu names 1600 or items (e.g., different types) is provided and can be selected and/or named by the user. Within each menu name, it can be seen that there are a number of individual recipes 1610 stored. An option may be presented to enable the user to select menu items and/or recipes for editing. Edited recipes can be saved as entirely new recipes, or the originally selected recipe may be changed.

Figure 17:
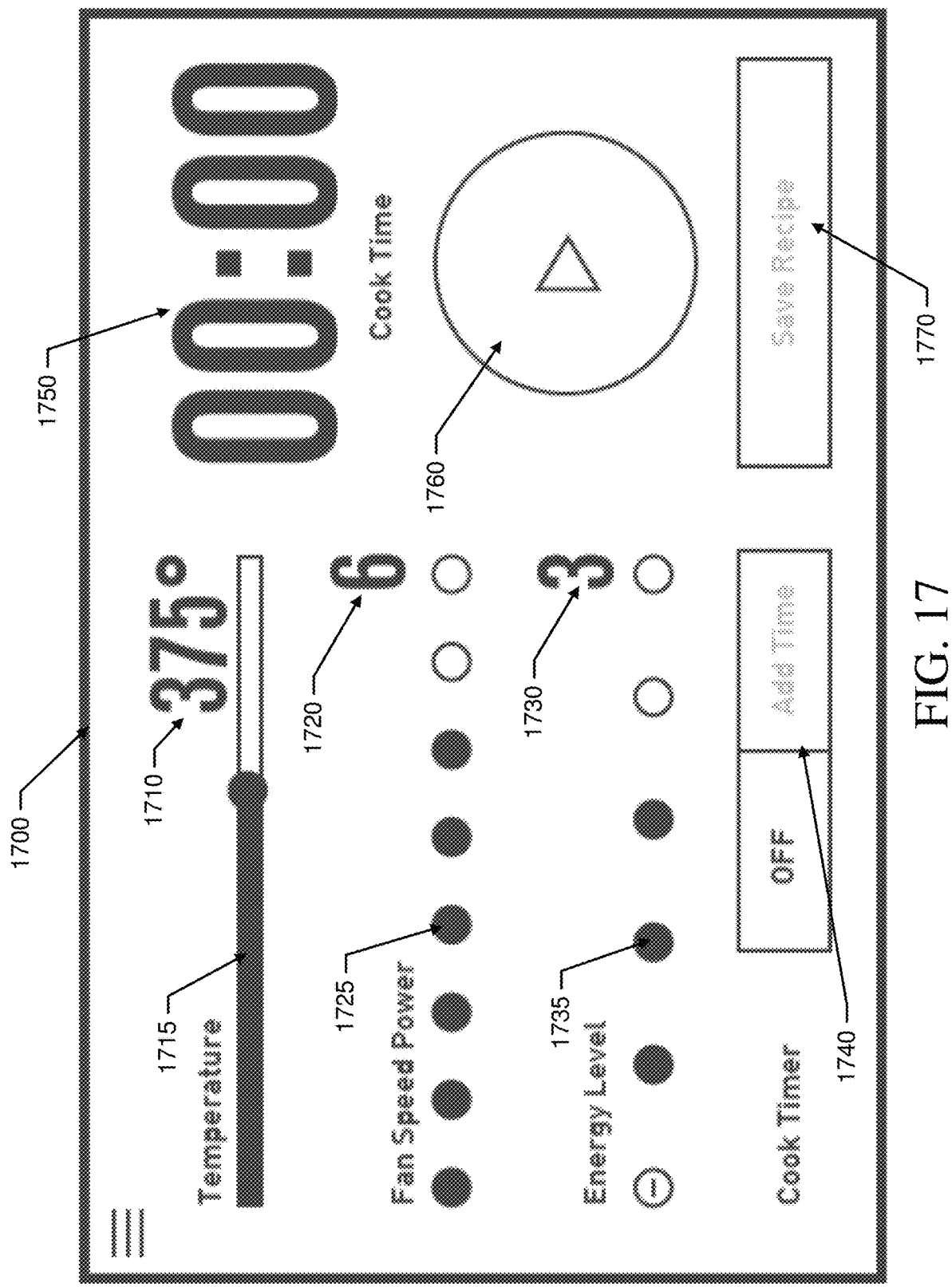
FIG. 17 illustrates a parameter selection screen for defining a cooking operation that can be saved as a recipe according to an example embodiment.

FIG. 17 illustrates an example interface console 1700 for definition of a recipe or for manual (e.g., advanced) control of the cooking process. A recipe (e.g., a cooking program) may be defined by selection of a cooking temperature 1710 from a temperature selector 1715 and a fan speed 1720 via a fan speed selector 1725. These selections provide instructions for the operation of the second energy source 210 during execution of the cooking program (e.g., during timer countdown).

The energy level 1730 is selected via an energy level selector 1735 to define the power level for RF generation by the RF generator 204. The cook timer 1740 allows the user to select a time duration for the application of cooking energy during execution of the cooking program via the first and/or second energy sources 200 and 210. When the time duration has been defined, it may be displayed by timer 1750. After all the above listed parameters are defined, the defined parameters can be executed for a cooking operation without saving as a cooking program by selection of the execution operator 1760. However, if the user would prefer to save the defined parameters as a cooking program, the user may select a recipe operator 1770 to save the defined parameters. In some embodiments, the cooking program may include multiple cooking steps, each with the potential for different temperature, fan speed, energy level and time settings. In such examples, each step may be separately saved as part of a larger multistep cooking program.

Figure 18:
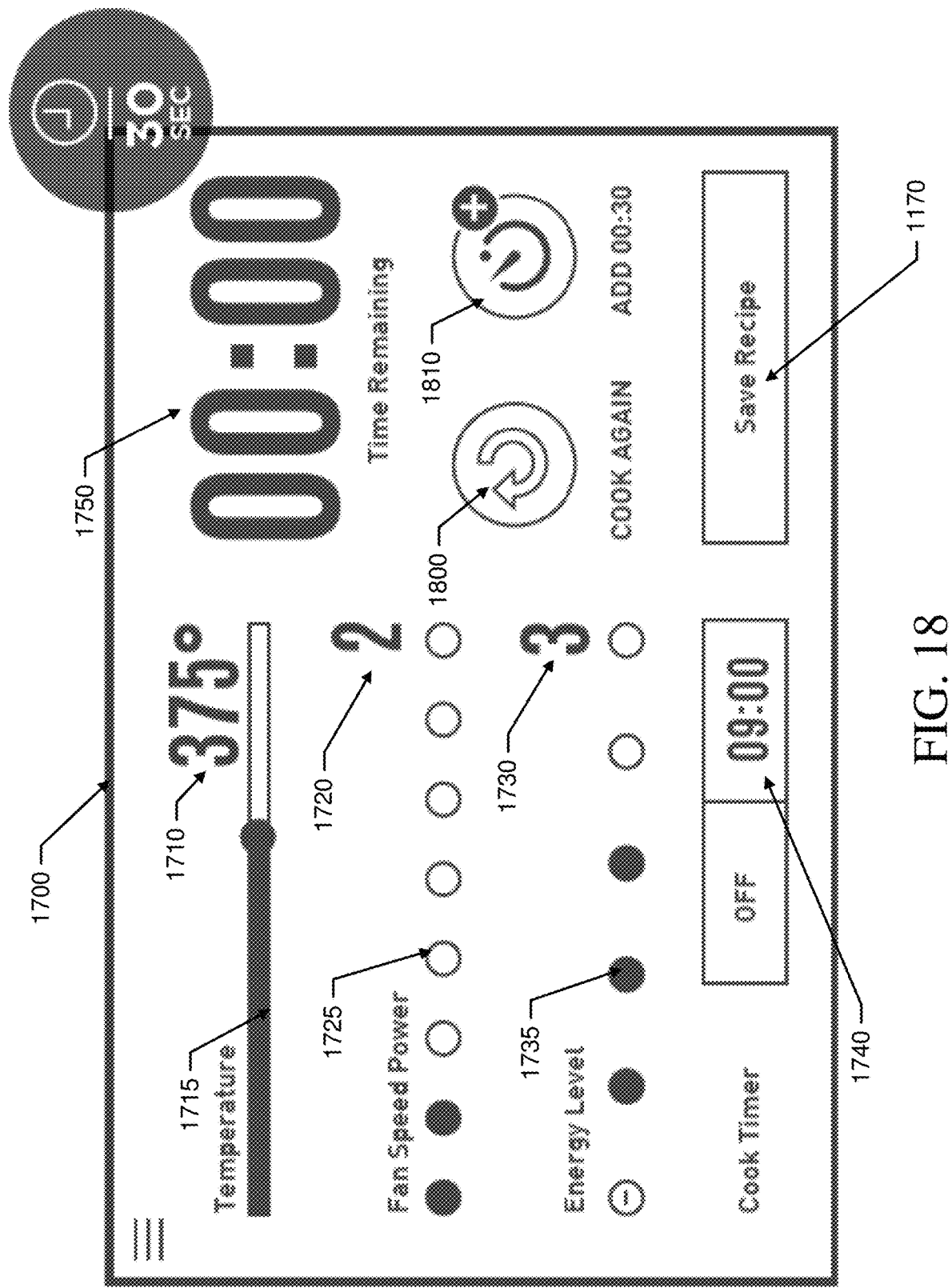
FIG. 18 illustrates the parameter selection screen after execution of the cooking operation according to an example embodiment.

In situations where the cooking operation is initially executed without saving by selection of the execution operator 1760 and the cooking operation proceeds to completion, the user may be provided with the option to repeat the cooking operation (again without saving) by selecting a repeat option 1800, as shown in FIG. 18. Alternatively, the user may opt to add additional time to the cooking operation by selecting the add time option 1810. The user may also elect to save the defined parameters as a cooking program by selection of the recipe operator 1770.

Figure 19:
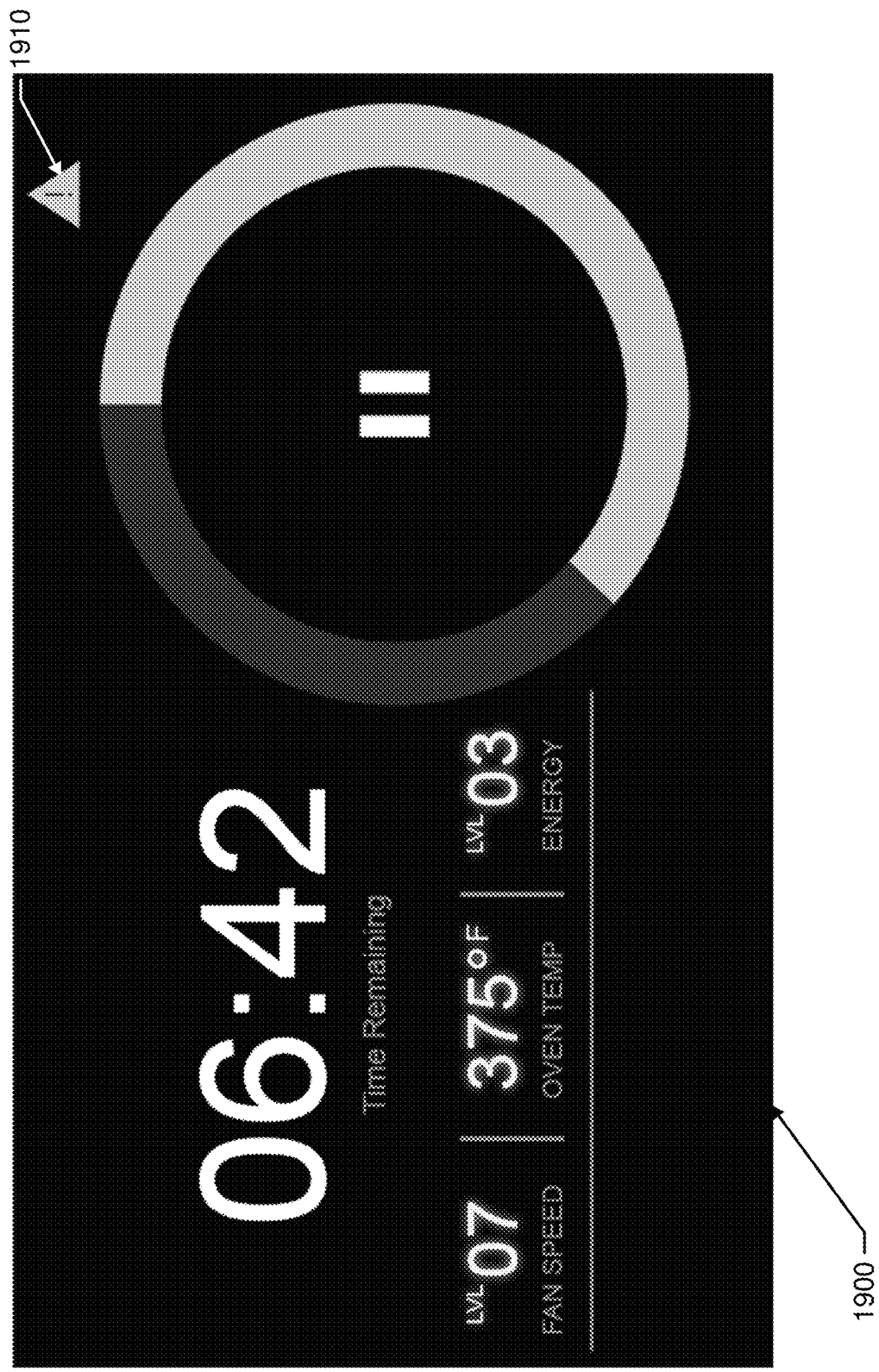
FIG. 19 illustrates a control console having a warning indicator disposed thereon in accordance with an example embodiment.

Although error or warning messages may sometimes be provided as overlay messages in the manner described above, in other cases, warning or error messages may be provided as separate screens. The existence of a warning or error message screen may be indicated by a warning or error indicator that may appear on any given screen that is presented until the user takes some action. For example, FIG. 19 illustrates a control console 1900 having a warning indicator 1910 disposed thereon in accordance with an example embodiment. The control console 1900 may present information and have functionality similar to the descriptions provided above. However, the warning indicator 1910 may appear, and may stay on the control console 1900 (or any other screen to which the user may navigate) until a predetermined time has passed, until a technician clears the warning after service, or (in some cases) until the user selects the warning indicator 1910 to review the warning associated therewith and note any restrictions or take any corresponding corrective action (if necessary).

Figure 20:
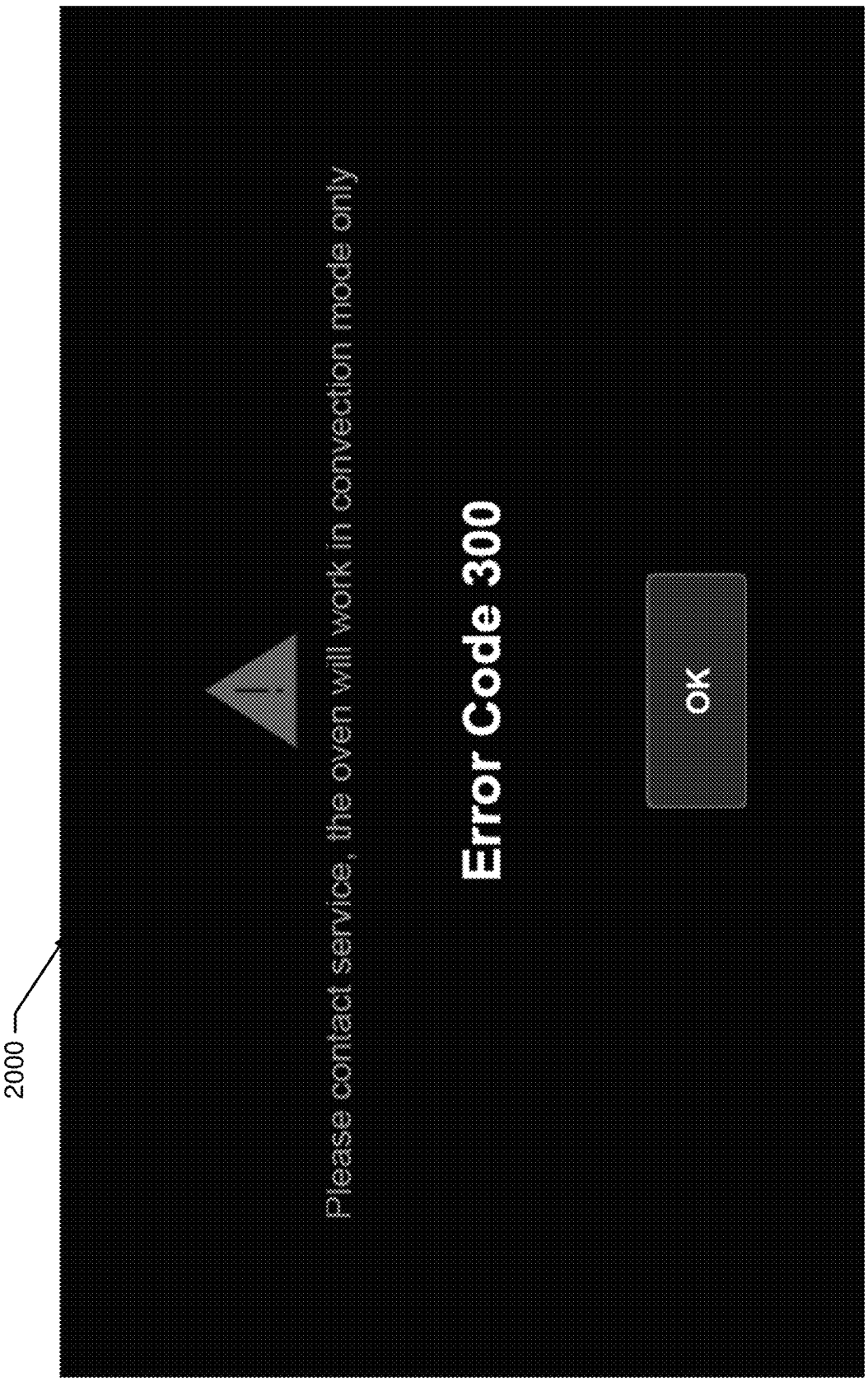
FIG. 20 illustrates an example of an error screen in accordance with an example embodiment.

In this regard, for example, FIG. 20 illustrates an example of an error screen 2000 that may be presented after selection of an error indicator selected from another screen. If the warning indicator 1910 of FIG. 19 were selected, a screen similar to the error screen of FIG. 20 may be provided to indicate the reason for the warning. However, in this instance, the triggering event is an error for which service is required. Thus, instead of the warning indicator 1910, an error indicator would be presented. Upon selection of the error indicator by the user, the error screen 2000 may be presented to the user to indicate the reason for the error, the way to resolve the error and/or the impact that the present situation or condition may have on continued operation of the oven 100. In this example, the error requires service to be contacted, and the oven 100 will only work in convection mode until the error is cleared by the service personnel.

Figure 21:
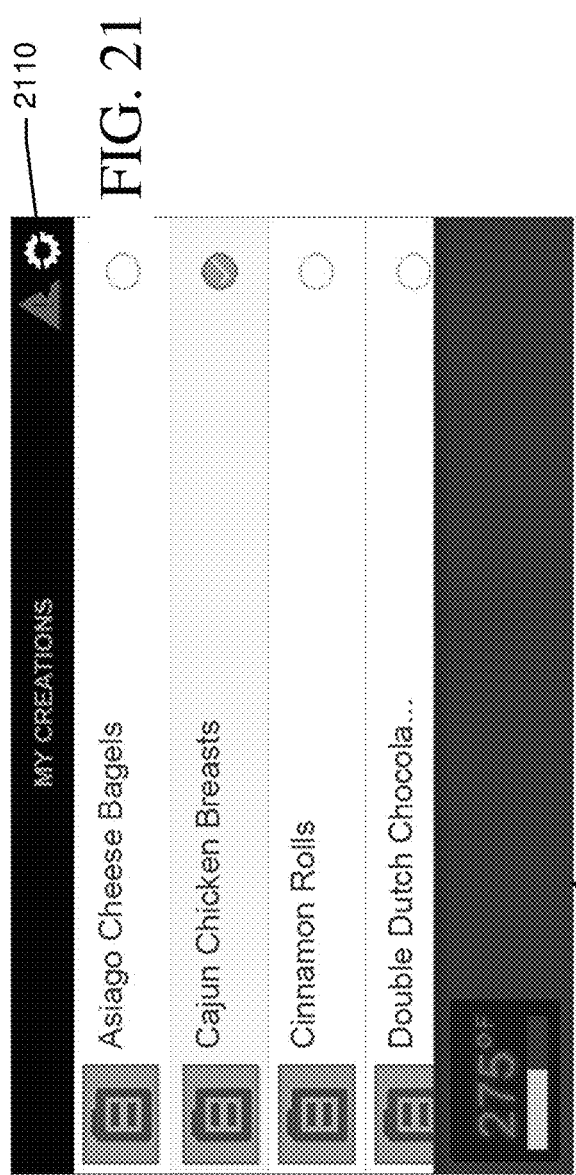
FIG. 21 illustrates an example recipe selection screen with an error indicator disposed thereon in accordance with an example embodiment.
Figure 22:
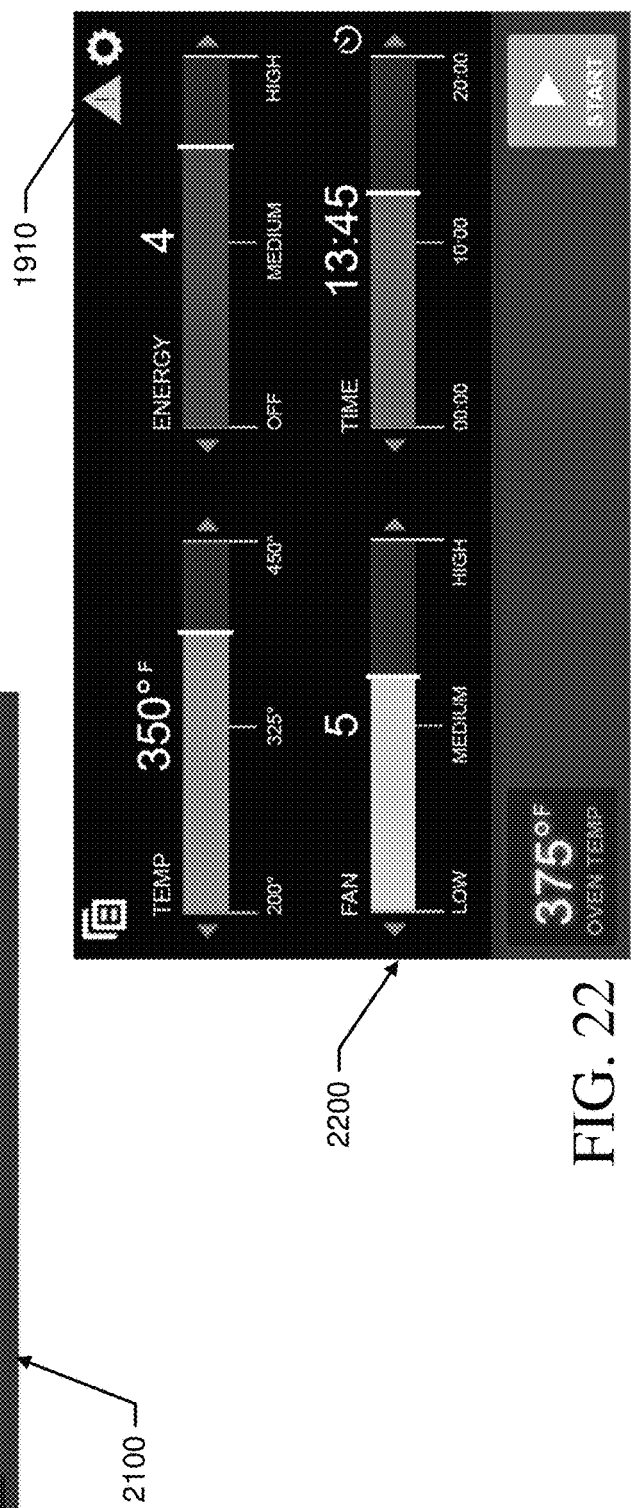
FIG. 22 illustrates a parameter selection screen having a warning indicator disposed thereon in accordance with an example embodiment.

As mentioned above, in some cases the warning or error indicator may be persistent until the user or a technician takes action or at least acknowledges the corresponding indicator. Thus, after a condition is encountered for which an error or warning indicator is provided, the corresponding indicator will be presented (in some cases always in the same location) on every screen to which the user navigates. FIG. 21 illustrates an example recipe selection screen 2100 with an error indicator 2110 disposed thereon. The error indicator 2110 may, if selected, lead the user to the error screen 2000 of FIG. 20, or to another similar error screen. Meanwhile, FIG. 22 illustrates a parameter selection screen 2200 having the warning indicator 1910 disposed thereon. Thus, it should be appreciated that the warning indicator 1910 could be displayed on the control console 1900, the recipe selection screen 2100 or the parameter selection screen 2200 (in roughly the same location) if a warning condition is detected, and the user may see the corresponding warning indicator 1910 even after changing screens, until the warning indicator 1910 is selected (to display a warning screen) and acknowledged or is otherwise removed for the reasons described above. In other cases, the warning indicator 1910 may effectively shrink from the initial larger size to a smaller size after acknowledgement by the user, but stay at the smaller size until the condition is cleared by a technician. In some cases, the error indicator 2110 could be could be displayed on the control console 1900, the recipe selection screen 2100 or the parameter selection screen 2200 (in roughly the same location) if an error condition is detected. The user will then see the corresponding error indicator 2110 even after changing screens, until the error indicator 2110 is selected. Upon selection of the error indicator 2110, the error screen 2000 may be presented until the user acknowledges the error screen 2000 and/or takes the prescribed action defined on the error screen 2000.

In an example embodiment, an oven may be provided. The oven may include a cooking chamber configured to receive a food product, a convective heating system configured to provide heated air into the cooking chamber, a radio frequency (RF) heating system configured to provide RF energy into the cooking chamber using solid state electronic components, and control electronics configured to control the convective heating system and the RF heating system. The control electronics may further control a user interface configured to define one or more control consoles. At least one of the control consoles may enable a user to select a cooking program. The user interface may further provide a single indicator showing a graphical representation of current progress relative to a representation of a full commitment of time to complete the selected cooking program. The single indicator may further provide a selectable operator that is operable to control progress toward completing the selected cooking program.

In some embodiments, additional optional features may be included or the features described above may be modified or augmented. Each of the additional features, modification or augmentations may be practiced in combination with the features above and/or in combination with each other. Thus, some, all or none of the additional features, modification or augmentations may be utilized in some embodiments. For example, in some cases, the single indicator may include a goal indicator surrounding the selectable operator. In some examples, the goal indicator may define a geometrical shape having a perimeter indicative of the full commitment of time to complete the selected cooking program. In some embodiments, the single indicator may further include a progress indicator extending along a portion of the goal indicator proportional to an amount of the full commitment of time that has already been completed. In such an example, the goal indicator may define a circular shape surrounding the selectable operator, and the progress indicator may extend clockwise along the goal indicator. In an example embodiment, in response to completion of the selected cooking program, a visual alert is provided via the user interface. The visual alert may include pulse rings generated to expand away from the goal indicator. In such an example, the pulse rings may have successively larger diameter rings of successively thinner width as a distance from a center of the goal indicator increases. In an example embodiment, the user interface may be configured to receive an indication of an adverse operating condition and provide a notification to the operator identifying the adverse operating condition along with an instruction for correcting the adverse operating condition. In some cases, the notification may be provided as an overlay to a previously provided control console. In an example embodiment, the user interface may be configured to detect an operational situation and provide an elective action instruction to improve the operational situation. In some cases, the elective action instruction is provided via an overlay to a previously provided control console.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
a cooking chamber configured to receive a food product;
a convective heating system configured to provide heated air into the cooking chamber;
a radio frequency (RF) heating system configured to provide RF energy into the cooking chamber using solid state electronic components; and
control electronics configured to control the convective heating system and the RF heating system, the control electronics further controlling a user interface configured to define one or more control consoles, at least one of the control consoles enabling a user to select a cooking program,
wherein the user interface further provides a single indicator showing a graphical representation of current progress relative to a representation of a full commitment of time to complete the selected cooking program, the single indicator further providing a selectable operator that is operable to control progress toward completing the selected cooking program,
wherein the single indicator comprises a goal indicator surrounding the selectable operator, and
wherein the single indicator further comprises a progress indicator extending along a portion of the goal indicator proportional to an amount of the full commitment of time that has already been completed.

2. The oven of claim 1, wherein the goal indicator defines a geometrical shape having a perimeter indicative of the full commitment of time to complete the selected cooking program.

3. The oven of claim 2, wherein in response to completion of the selected cooking program, a visual alert is provided via the user interface, the visual alert comprising pulse rings generated to expand away from the goal indicator.

4. The oven of claim 3, wherein the pulse rings have successively larger diameter rings of successively thinner width as a distance from a center of the goal indicator increases.

5. The oven of claim 1, wherein the goal indicator defines a circular shape surrounding the selectable operator, and the progress indicator extends clockwise along the goal indicator.

6. The oven of claim 1, wherein the user interface is configured to receive an indication of an adverse operating condition and provide a notification to the operator identifying the adverse operating condition and instruction for correcting the adverse operating condition.

7. The oven of claim 6, wherein the notification is provided as an overlay to a previously provided control console.

8. The oven of claim 1, wherein the user interface is configured to detect an operational situation and provide an elective action instruction to improve the operational situation.

9. The oven of claim 8, wherein the elective action instruction is provided via an overlay to a previously provided control console.

10. Control electronics comprising a user interface, the control electronics being further configured to control a radio frequency (RF) heating system configured to provide RF energy into a cooking chamber of an oven using solid state electronic components,
wherein the control electronics are configured to define one or more control consoles, at least one of the control consoles enabling a user to select a cooking program for execution to cooking a food product in the cooking chamber via the RF heating system,
wherein the user interface provides a single indicator showing a graphical representation of current progress relative to a representation of a full commitment of time to complete the selected cooking program, the single indicator further providing a selectable operator that is operable to control progress toward completing the selected cooking program,
wherein the single indicator comprises a goal indicator surrounding the selectable operator,
wherein the goal indicator defines a geometrical shape having a perimeter indicative of the full commitment of time to complete the selected cooking program, and
wherein the single indicator further comprises a progress indicator extending along a portion of the goal indicator proportional to an amount of the full commitment of time that has already been completed.

11. The control electronics of claim 10, wherein the goal indicator defines a geometrical shape having a perimeter indicative of the full commitment of time to complete the selected cooking program.

12. The control electronics of claim 11, wherein in response to completion of the selected cooking program, a visual alert is provided via the user interface, the visual alert comprising pulse rings generated to expand away from the goal indicator.

13. The control electronics of claim 12, wherein the pulse rings have successively larger diameter rings of successively thinner width as a distance from a center of the goal indicator increases.

14. The control electronics of claim 10, wherein the goal indicator defines a circular shape surrounding the selectable operator, and the progress indicator extends clockwise along the goal indicator.

15. The control electronics of claim 10, wherein the user interface is configured to receive an indication of an adverse operating condition and provide a notification to the operator identifying the adverse operating condition and instruction for correcting the adverse operating condition.

16. The control electronics of claim 10, wherein the user interface is configured to detect an operational situation and provide an elective action instruction to improve the operational situation.

17. Control electronics comprising a user interface, the control electronics being further configured to control a radio frequency (RF) heating system configured to provide RF energy into a cooking chamber of an oven using solid state electronic components,
 wherein the control electronics are configured to define one or more control consoles, at least one of the control consoles enabling a user to select a cooking program for execution to cooking a food product in the cooking chamber via the RF heating system,
 wherein the user interface provides a single indicator showing a graphical representation of current progress relative to a representation of a full commitment of time to complete the selected cooking program, the single indicator further providing a selectable operator that is operable to control progress toward completing the selected cooking program,
 wherein the single indicator comprises a goal indicator surrounding the selectable operator, and
 wherein in response to completion of the selected cooking program, a visual alert is provided via the user interface, the visual alert comprising pulse rings generated to expand away from the goal indicator.

18. The control electronics of claim 17, wherein the pulse rings have successively larger diameter rings of successively thinner width as a distance from a center of the goal indicator increases.

19. The control electronics of claim 17, wherein the user interface is configured to receive an indication of an adverse operating condition and provide a notification to the operator identifying the adverse operating condition and instruction for correcting the adverse operating condition.

20. The control electronics of claim 17, wherein the user interface is configured to detect an operational situation and provide an elective action instruction to improve the operational situation.

* * * * *